United States Patent
Yoon et al.

(10) Patent No.: US 12,457,286 B2
(45) Date of Patent: Oct. 28, 2025

(54) ELECTRONIC DEVICE INCLUDING ROLLABLE OR SLIDABLE DISPLAY

(71) Applicant: Samsung Electronics Co., Ltd., Suwon-si (KR)

(72) Inventors: Yeonggyu Yoon, Suwon-si (KR); Dahee Kim, Suwon-si (KR); Moonsun Kim, Suwon-si (KR); Sukdong Kim, Suwon-si (KR); Soohyun Seo, Suwon-si (KR); Wonkyu Sung, Suwon-si (KR); Changhan Lee, Suwon-si (KR); Hyoungtak Cho, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 392 days.

(21) Appl. No.: 18/153,673

(22) Filed: Jan. 12, 2023

(65) Prior Publication Data
US 2023/0156116 A1 May 18, 2023

Related U.S. Application Data

(63) Continuation of application No. PCT/KR2021/009895, filed on Jul. 29, 2021.

(30) Foreign Application Priority Data

Jul. 29, 2020 (KR) ............ 10-2020-0094371
Jun. 1, 2021 (KR) ............ 10-2021-0071011

(51) Int. Cl.
*H04M 1/72454* (2021.01)
*G06F 1/16* (2006.01)
*H04M 1/02* (2006.01)

(52) U.S. Cl.
CPC ...... *H04M 1/72454* (2021.01); *G06F 1/1607* (2013.01); *G06F 1/1624* (2013.01);
(Continued)

(58) Field of Classification Search
CPC ........... H04M 1/72454; H04M 1/0235; H04M 2201/38; H04M 2201/42; G06F 1/1607; G06F 1/1624; G06F 2200/1632
See application file for complete search history.

(56) References Cited

U.S. PATENT DOCUMENTS 5,719,936 A * 2/1998 Hillenmayer .......... H04N 7/147
                                                              455/566
8,760,414 B2 * 6/2014 Kim ...................... G06F 1/1692
                                                              345/169
(Continued)

FOREIGN PATENT DOCUMENTS

CN          108259649 A    7/2018
EP          2 204 724 A1   7/2010
(Continued)

OTHER PUBLICATIONS

European Search Report dated Dec. 4, 2023, issued in European Application No. 21849876.4.
(Continued)

*Primary Examiner* — Lewis G West
(74) *Attorney, Agent, or Firm* — Jefferson IP Law, LLP

(57) ABSTRACT

An electronic device is provided. The electronic device includes a first housing, a second housing slidably coupled to the first housing, a display of which at least a part is fixed to the second housing so that an information display region, which is a part of the electronic device visible on the outside, increases or decreases according to the sliding of the second housing, and a support member including a bendable structure, supporting at least a part of the display, and moving (Continued)

according to the sliding of the second housing, wherein, the information display region increases if the second housing slides in a first direction at a reference position at which the end of the second housing and the end of the first housing are substantially aligned, and the information display region decreases if the second housing slides in a second direction opposite to the first direction at the reference position.

14 Claims, 29 Drawing Sheets

(52) U.S. Cl.
CPC ... *H04M 1/0235* (2013.01); *G06F 2200/1632* (2013.01); *H04M 2201/38* (2013.01); *H04M 2201/42* (2013.01)

(56) References Cited

U.S. PATENT DOCUMENTS

| | | | | |
|---|---|---|---|---|
| 10,461,275 | B2* | 10/2019 | Wang | H10K 77/111 |
| 10,871,797 | B1 | 12/2020 | Jo et al. | |
| 10,904,371 | B1 | 1/2021 | Song et al. | |
| 10,976,775 | B1* | 4/2021 | Cha | H05K 7/1401 |
| 11,048,305 | B1* | 6/2021 | Ye | G06F 1/1681 |
| 11,481,003 | B2* | 10/2022 | Cho | G06F 1/1652 |
| 11,587,473 | B2* | 2/2023 | Feng | G09F 9/301 |
| 11,612,065 | B2* | 3/2023 | Wu | H05K 5/0017 |
| 2003/0222847 | A1 | 12/2003 | Nguyen et al. | |
| 2006/0104013 | A1* | 5/2006 | Sakakibara | G06F 1/1643 |
| | | | | 361/679.56 |
| 2007/0232368 | A1* | 10/2007 | Feightner | H04M 1/0235 |
| | | | | 455/575.1 |
| 2008/0146298 | A1 | 6/2008 | Kwak | |
| 2009/0009423 | A1* | 1/2009 | Huang | G06F 1/1624 |
| | | | | 345/1.1 |
| 2010/0207897 | A1* | 8/2010 | Ono | H01Q 1/44 |
| | | | | 345/173 |
| 2010/0246103 | A1* | 9/2010 | Visser | G06F 1/1616 |
| | | | | 361/679.01 |
| 2011/0095975 | A1* | 4/2011 | Hwang | G06F 1/1626 |
| | | | | 345/156 |
| 2013/0058063 | A1 | 3/2013 | O'Brien | |
| 2014/0361004 | A1* | 12/2014 | Jang | H10K 59/8794 |
| | | | | 219/494 |
| 2016/0048169 | A1* | 2/2016 | Yang | G02F 1/133305 |
| | | | | 361/749 |
| 2016/0070306 | A1* | 3/2016 | Shin | H04M 1/0268 |
| | | | | 361/679.27 |
| 2016/0307545 | A1 | 10/2016 | Lee et al. | |
| 2017/0047547 | A1* | 2/2017 | Son | H10K 50/844 |
| 2017/0123536 | A1* | 5/2017 | Aurongzeb | G06F 1/1652 |
| 2017/0194580 | A1* | 7/2017 | Lee | H10K 77/111 |
| 2018/0164852 | A1* | 6/2018 | Lim | H04M 1/0214 |
| 2018/0275770 | A1 | 9/2018 | Kang et al. | |
| 2018/0329521 | A1 | 11/2018 | Hesketh et al. | |
| 2018/0364827 | A1* | 12/2018 | Chung | G06F 1/1677 |
| 2019/0132947 | A1* | 5/2019 | Koo | H05K 1/0281 |
| 2019/0261519 | A1* | 8/2019 | Park | H04M 1/0235 |
| 2019/0302850 | A1* | 10/2019 | Park | H04M 1/0268 |
| 2019/0326530 | A1* | 10/2019 | Chen | H10K 59/00 |
| 2019/0346954 | A1 | 11/2019 | Jung et al. | |
| 2020/0243780 | A1* | 7/2020 | Dong | H10K 71/00 |
| 2020/0253069 | A1 | 8/2020 | Cha | |
| 2020/0371273 | A1* | 11/2020 | Hou | H10K 50/84 |
| 2021/0012751 | A1 | 1/2021 | An et al. | |
| 2021/0044683 | A1* | 2/2021 | He | G06F 1/1652 |
| 2021/0208629 | A1 | 7/2021 | Jo et al. | |
| 2021/0219437 | A1* | 7/2021 | Kim | G06F 1/1652 |
| 2021/0267073 | A1* | 8/2021 | Fan | G06F 1/1656 |
| 2021/0366318 | A1* | 11/2021 | Feng | G09F 9/301 |
| 2022/0091689 | A1* | 3/2022 | Kishimoto | G06F 1/1643 |
| 2022/0117101 | A1* | 4/2022 | Lee | G06F 1/1652 |
| 2022/0191312 | A1* | 6/2022 | Yan | G09F 9/301 |
| 2022/0287189 | A1* | 9/2022 | Kim | H05K 5/0226 |
| 2022/0295655 | A1* | 9/2022 | Zhu | G06F 1/1652 |
| 2022/0322547 | A1* | 10/2022 | Wang | G06F 1/1652 |
| 2022/0382331 | A1 | 12/2022 | Choi et al. | |
| 2022/0413548 | A1* | 12/2022 | Sun | G06F 1/1616 |
| 2023/0092100 | A1* | 3/2023 | Locke | H04M 1/233 |
| | | | | 348/333.06 |
| 2023/0130073 | A1* | 4/2023 | Han | G06F 1/1616 |
| | | | | 455/575.3 |

FOREIGN PATENT DOCUMENTS

| | | |
|---|---|---|
| EP | 3 537 258 A1 | 9/2019 |
| KR | 10-2016-0097033 A | 8/2016 |
| KR | 10-2017-0038308 A | 4/2017 |
| KR | 10-2019-0077107 A | 7/2019 |
| KR | 10-2019-0080516 A | 7/2019 |
| KR | 10-2019-0110318 A | 9/2019 |
| KR | 10-2019-0128843 A | 11/2019 |
| KR | 10-2019-0143029 A | 12/2019 |
| KR | 10-2111376 B1 | 5/2020 |
| KR | 10-2020-0095307 A | 8/2020 |
| KR | 10-2022-0088879 A | 6/2022 |
| KR | 10-2407596 B1 | 6/2022 |

OTHER PUBLICATIONS

International Search Report dated Oct. 29, 2021, issued in International Application No. PCT/KR2021/009895.

International Search Report dated Oct. 27, 2021, issued in International Application No. PCT/KR2021/009921.

\* cited by examiner

ELECTRONIC DEVICE INCLUDING ROLLABLE OR SLIDABLE DISPLAY

CROSS-REFERENCE TO RELATED APPLICATION(S)

This application is a continuation application, claiming priority under § 365(c), of an International application No. PCT/KR2021/009895, filed on Jul. 29, 2021, which is based on and claims the benefit of a Korean patent application number 10-2020-0094371, filed on Jul. 29, 2020, in the Korean Intellectual Property Office, and of a Korean patent application number 10-2021-0071011, filed on Jun. 1, 2021, in the Korean Intellectual Property Office, the disclosure of each of which is incorporated by reference herein in its entirety.

BACKGROUND

1. Field

The disclosure relates to an electronic device including a rollable or slidable display.

2. Description of Related Art

A display may play a key role in a portable electronic device. The display may visually display information. Factors such as design, size, and quality of a display may play an important role when consumers select an electronic device.

With the recent development of display technology, flexible displays are being released to the market. By using such a flexible display, a display having a screen, the size of which is variable may also be implemented. For example, an electronic device including a display rollable by a specific mechanical material or having a screen size increasing or decreasing through sliding is also being developed.

The above information is presented as background information only to assist with an understanding of the disclosure. No determination has been made, and no assertion is made, as to whether any of the above might be applicable as prior art with regard to the disclosure.

SUMMARY

Especially, with the continuous size reduction of portable electronic devices, an extra space is decreasing. A space for receiving an external device (e.g., a stylus pen or a secure digital (SD) card) which increases the usability of an electronic device or a space in which a device (e.g., a camera, a speaker, a physical button, or an auxiliary display) configured to perform a specific function may be disposed is also gradually disappearing.

Aspects of the disclosure are to address at least the above-mentioned problems and/or disadvantages and to provide at least the advantages described below. Accordingly, an aspect of the disclosure is to provide an electronic device including a rollable or slidable display, particularly, an electronic device using an extra space which can be secured according to movement of a display.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing slidably coupled with respect to the first housing, a display at least partially fixed to the second housing and comprising an information display region increasing or decreasing according to the sliding of the second housing, the information display region being a part of the electronic device visible to the exterior, and a support member including a bendable structure and configured to support at least a part of the display and move according to the sliding of the second housing, wherein the display is configured such that a size of the information display region increases in case that the second housing slides in a first direction at a reference position at which an end of the second housing and an end of the first housing are substantially aligned with each other, and a size of the information display region decreases in case that the second housing slides in a second direction opposite to the first direction at the reference position.

In accordance with another aspect of the disclosure, an electronic device is provided. The electronic device includes a first housing, a second housing slidably coupled with respect to the first housing, a display at least partially fixed to the second housing and comprising an information display region increasing or decreasing according to the sliding of the second housing, the information display region being a part of the electronic device visible to the outside, a support member including a bendable structure and configured to support at least a part of the display and move according to the sliding of the second housing, and a hidden region positioned between the second housing and the first housing and exposed to the outside of the electronic device by the sliding of the second housing with respect to the first housing.

According to various embodiments disclosed herein, an extra space in which various structures or devices for increasing the usability of an electronic device may be disposed can be secured.

In addition, the electronic device may perform various operations by detecting the movement of a display as an input and thus may improve the usability thereof.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
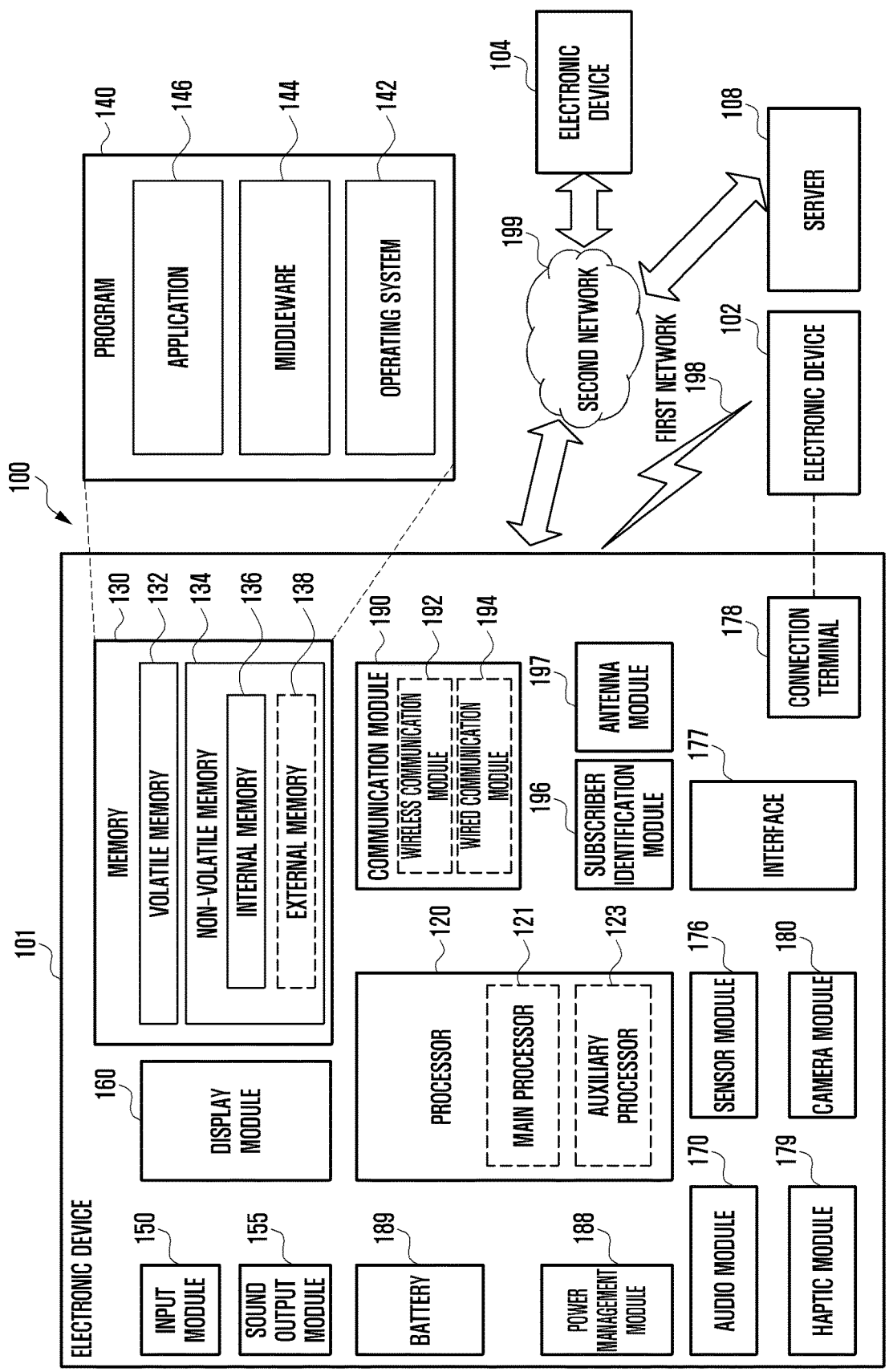
FIG. 1 is a block diagram of an electronic device in a network environment, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that various embodiments of the disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements.

As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The non-volatile memory may include internal memory 136 and external memory 138. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter(mm) Wave band) to achieve, e.g., a high data transmission rate. The wireless communication module 192 may support various technologies for securing performance on a high-frequency band, such as, e.g., beam-forming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
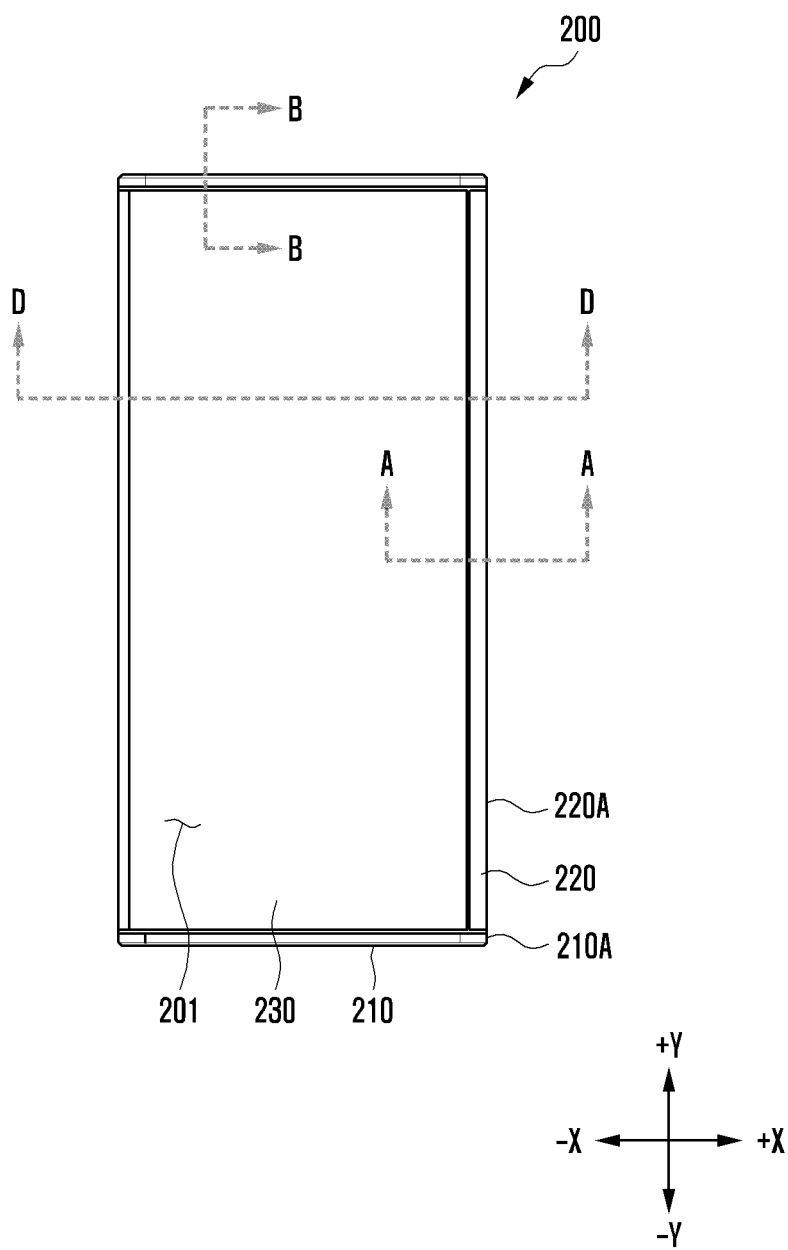
FIGS. 2A, 2B, and 2C illustrate various states of an electronic device according to various embodiments of the disclosure.
Figure 2B:
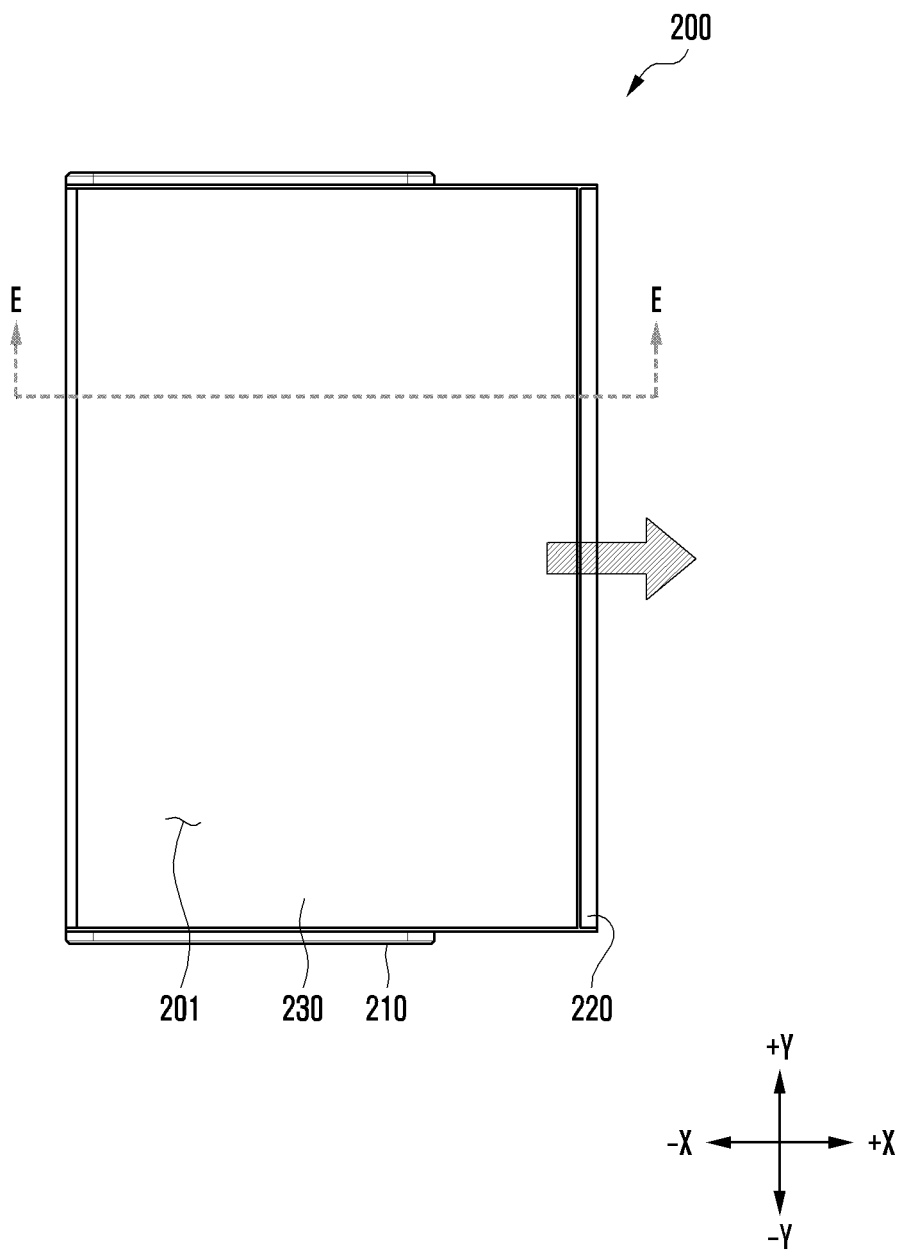
Figure 2C:
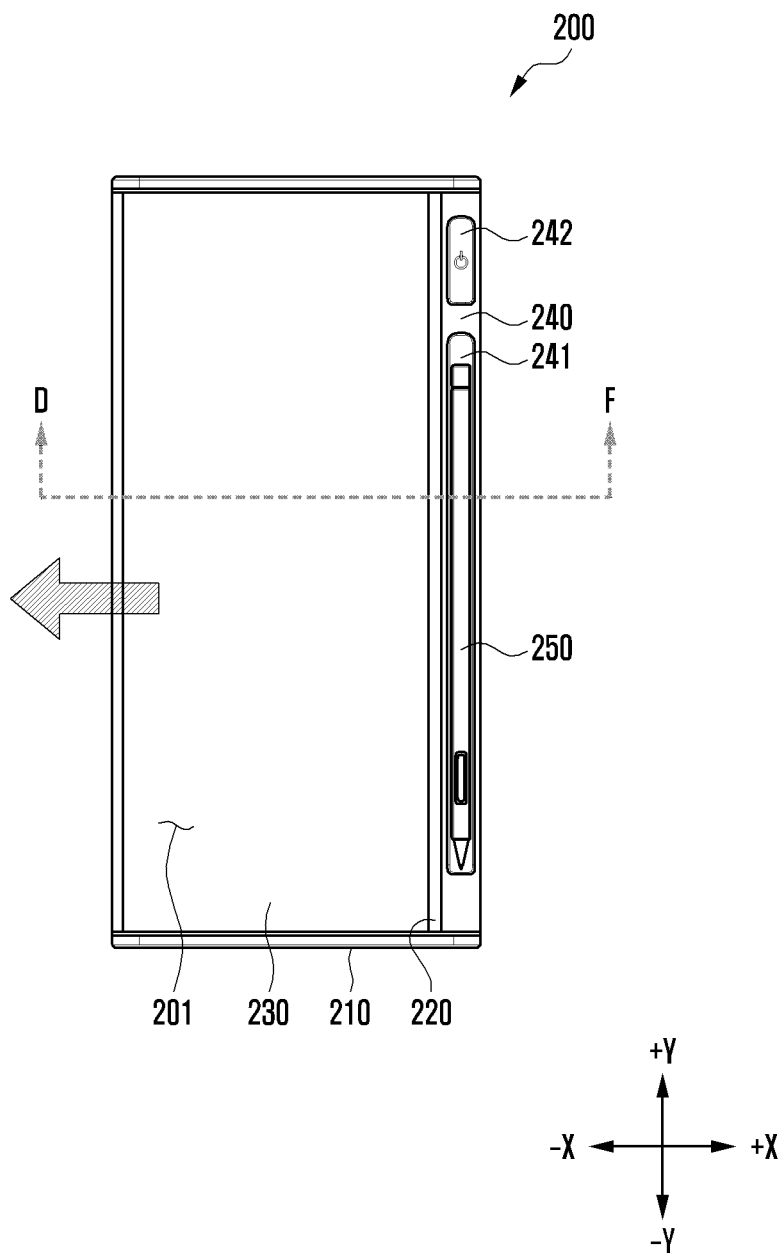

FIGS. 2A to 2C illustrate various states of an electronic device according to various embodiments of the disclosure.

Figure 3A:
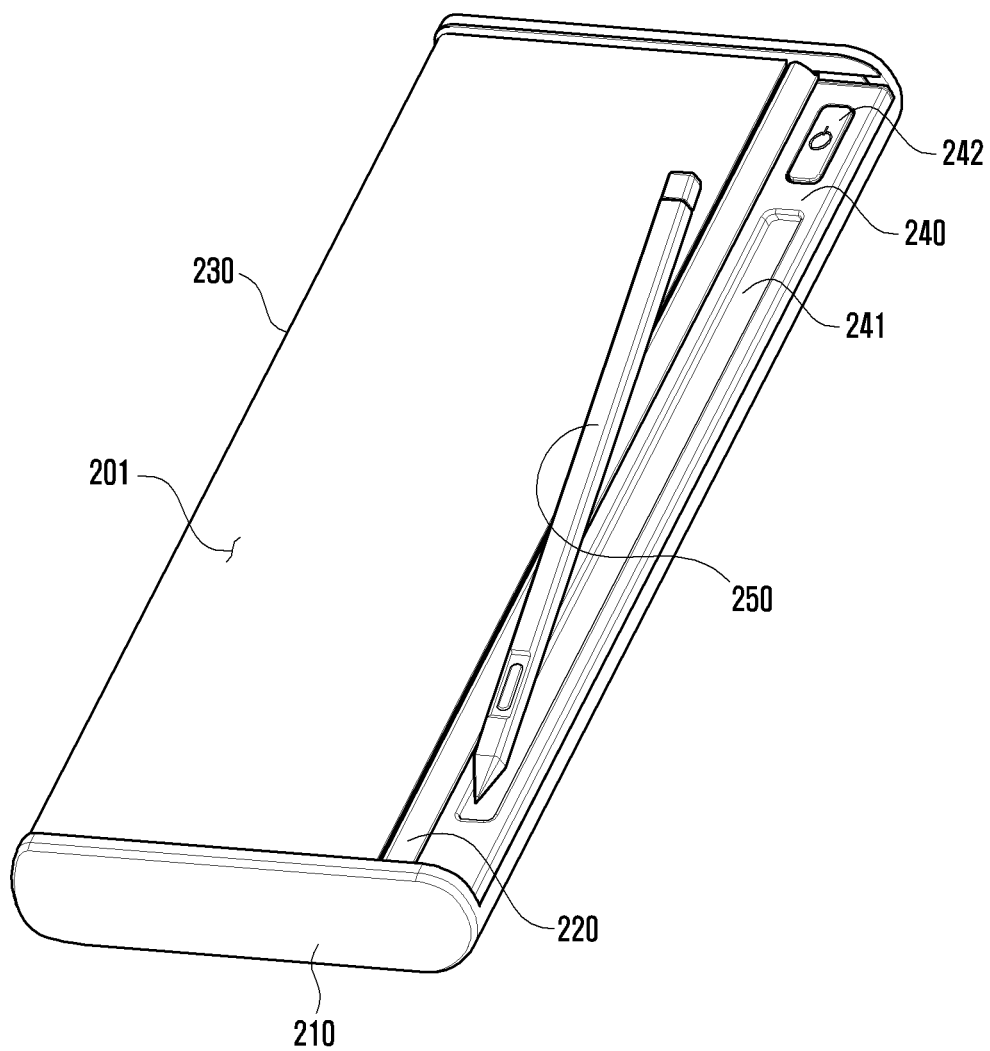
FIG. 3A illustrates a state in which an electronic device is being used according to an embodiment of the disclosure.

FIG. 3A illustrates a state in which an electronic device according to an embodiment of the disclosure.

Figure 3B:
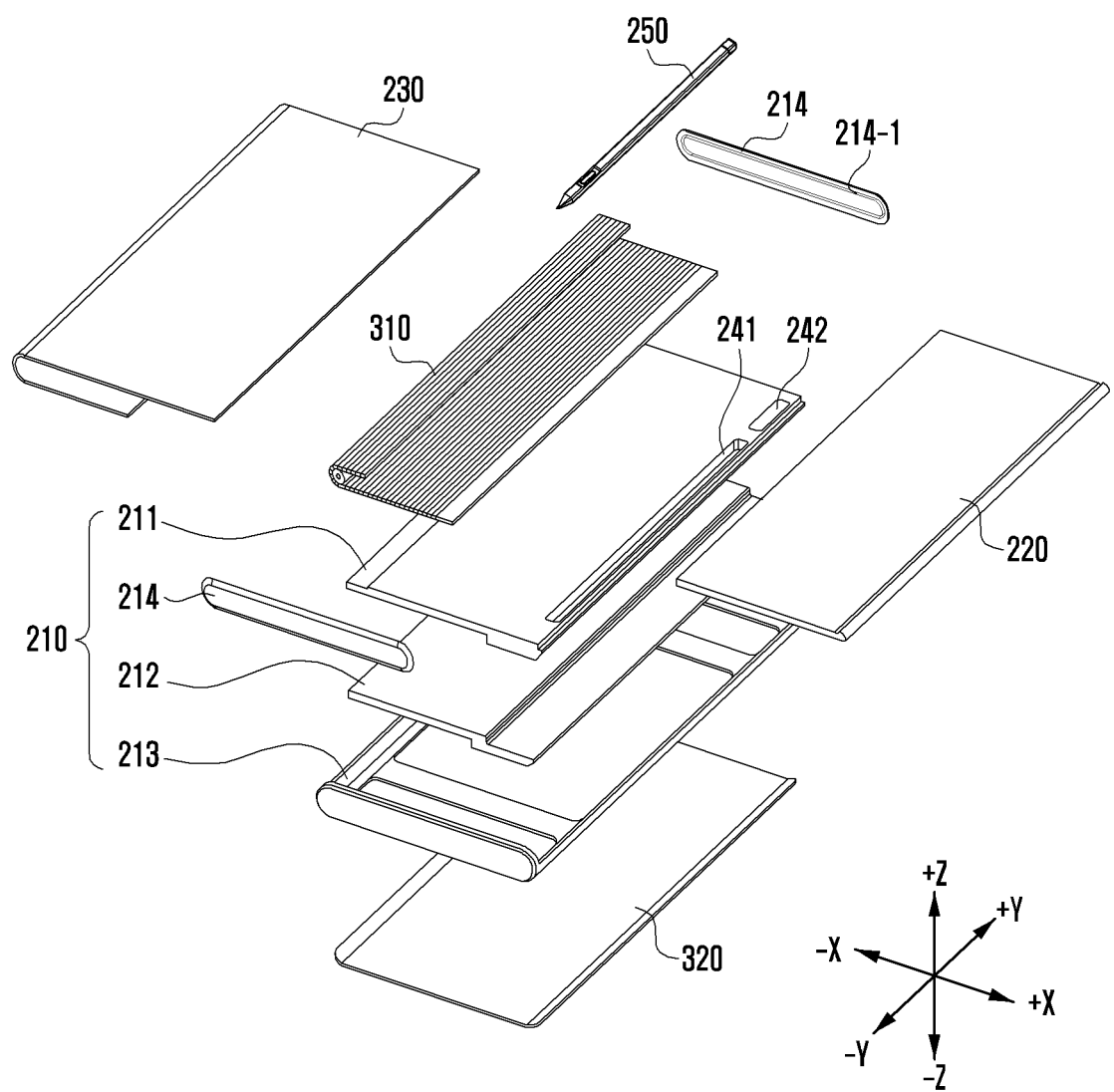
FIG. 3B is an exploded perspective view of an electronic device according to an embodiment of the disclosure.

FIG. 3B is an exploded perspective view of an electronic device according to an embodiment of the disclosure.

Figure 3C:
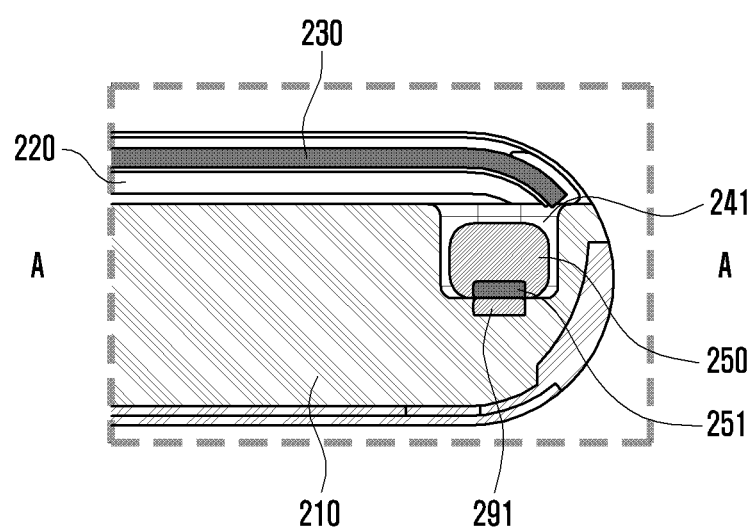
FIGS. 3C and 3D are cross-sectional views of the electronic device shown in FIG. 2A, taken along line A-A, according to various embodiments of the disclosure.
Figure 3D:
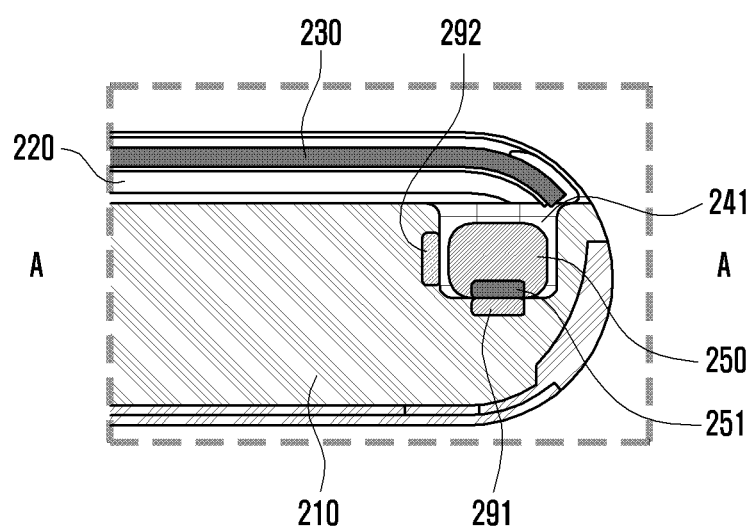

FIGS. 3C and 3D are cross-sectional views, taken along line A-A, of the electronic device shown in FIG. 2A according to various embodiments of the disclosure.

According to various embodiments, the electronic device 200 illustrated in FIGS. 2A, 2C, 3A, and 3B may be one of the electronic devices 101 described with reference to FIG. 1.

Referring to FIGS. 2A to 2C, the electronic device 200 may be implemented to include a display 230, an information display region 201 of which is increased or decreased through a sliding operation of the display 230. The information display region 201 may be a part of a display 230 which is visible to the outside of the electronic device 200. Information output to the display 230 may be visually transmitted to a user through the information display region 201.

According to various embodiments, the information display region 201 of the electronic device 200 may increase or decrease by a sliding operation thereof. In an embodiment, the sliding operation of the electronic device 200 may refer to sliding of a second housing 220 with respect to a first housing 210. The second housing 220 may slide in a first direction (e.g., the +X direction in FIGS. 2A to 2C) or a second direction (e.g., the −X direction in FIGS. 2A to 2C) opposite to the first direction with respect to the first housing 210.

According to various embodiments, the electronic device 200 may be switched from the reference state (e.g., the state illustrated in FIG. 2A) to a first state (e.g., the state illustrated in FIG. 2B) or a second state (e.g., the state illustrated in FIG. 2C) by the sliding operation. The reference state may refer to a state in which an end of the first housing 210 and an end of the second housing 220 are substantially aligned with each other. For example, as shown in FIG. 2A, the reference state may refer to a state in which the second housing 220 protrudes with respect to the first housing 210 or the first housing 210 does not protrude with respect to the second housing 220. The reference state may refer to a state in which the first housing 210 and the second housing 220 are aligned with each other. The first state may refer to a state in which the second housing 220 has slid in the first direction with respect to the first housing 210 in the reference state. The second state may refer to a state in which the second housing 220 has slid in the second direction with respect to the first housing 210 from the reference state. The information display region (e.g., the information display region 201 of FIG. 2C) in the second state may be smaller than the information display region (e.g., the information display region 201 of FIG. 2B) in the first state.

As described above, the display 230 having the information display region 201 variable according to a sliding operation may be defined as a "slidable display". In addition, the display 230 may include a partial section which is bendable by being guided by a roller (e.g., the roller 410 of FIG. 4A) to be described later. The display 230 including a partial region which is bent by being guided by a roller may be defined as a "rollable display". The display 230 described below may be understood as a "slidable or rollable display".

According to an embodiment, sliding of the second housing 220 with respect to the first housing 210 may be performed semi-automatically. For example, sliding of the second housing 220 with respect to the first housing 210 may be performed by a member (e.g., the elastic member 630 of FIG. 6A) that provides an elastic force in the sliding direction. In this case, when the sliding of the second housing 220 with respect to the first housing 210 is partially made, the second housing 220 may slide by the elastic force provided to the first housing 210 and/or the second housing 220.

According to an embodiment, sliding of the second housing 220 with respect to the first housing 210 may be performed automatically. For example, the second housing 220 may slide with respect to the first housing 210 by a motor. A motor for sliding the second housing 220 may operate according to a signal input through a sensor and various buttons (e.g., a physical button 242, a virtual button) included in the electronic device 200.

According to various embodiments, the electronic device 200 may be switched to the reference state (a closed state or a slide-in state) by a sliding operation. For example, the electronic device 200 illustrated in FIG. 2A may be understood to be in the reference state. The reference state may be understood as a state in which the end 220A of the second housing 220 is substantially aligned with the end 210A of the first housing 210. In the reference state, the end 210A of the first housing 210 and the end 220A of the second housing 220 may form a boundary of the electronic device 200. In the reference state, the end 220A of the second housing 220 may protrude in the first direction with respect to the end 210A of the first housing 210 or may not be retracted in the second direction. When the second housing 220 slides in the first direction in the reference state, the electronic device 200 may be switched to the first state. When the second housing 220 slides in the second direction in the reference state, the electronic device 200 may be switched to the second state. In the following description, the position of the second housing 220 in the reference state will be defined as a "reference position".

According to various embodiments, when the second housing 220 slides in the second direction in the reference state, as shown in FIG. 2C, a hidden region 240 located between the first housing and the second housing may be visually recognized to the outside. For example, a receiving space 241 capable of receiving an external device (e.g., the stylus pen 250) and a physical button 242 may be disposed in the hidden region 240. The receiving space 241 and the physical button 242 included in the hidden region 240 shown in FIG. 2C are merely examples of various components that can be disposed in the hidden region 240, and various other components may be disposed the hidden region 240. Various components disposed in the hidden region 240 will be described later.

According to various embodiments, the first housing 210 may include at least one sub-housing 211, 212, 213 and a guide housing 214. For example, as shown in FIG. 3B, the first housing 210 may include a first sub-housing 211, a second sub-housing 212, a third sub-housing 213, and a guide housing 214. In an embodiment, the receiving space 241 may be disposed in a partial region of the first sub-housing 211. The receiving space 241 may be a space configured to receive an external device. For example, as shown in FIG. 3B, the receiving space 241 may be a space for receiving a pen input device (e.g., a stylus pen). In an embodiment, a receiving space for receiving a part of the display 230 (e.g., the receiving space 430 of FIG. 4A) may be provided between the third sub-housing 213 and the second sub-housing 212. In an embodiment, a pair of guide housings 214 may be provided in both sides (e.g., the +Y direction and the −Y direction in FIG. 3B) of the electronic device 200 to be coupled to the assembly of the first sub-housing 211, the second sub-housing 212, and the third sub-housing 213. The guide housing 214 may include a guide rail 214-1. The guide rail 214-1 may be a groove configured in the guide housing 214 to guide the sliding motion of the second housing 220 and the support member 310. The protrusions (e.g., the protrusions 221 and 311 of FIG. 5A) disposed on the second housing 220 and the support member 310 may slide while being inserted into the guide rail 214-1, and accordingly, the guide rail 214-1 may guide the sliding of the second housing 220 and the support member 310.

According to various embodiments, the second housing 220 may support a part of the display 230. At least a part of the display 230 may be fixed to the second housing 220, and when the second housing 220 slides with respect to the first housing 210, the at least part of the display 230 may move along the second housing 220.

According to various embodiments, the support member 310 may support a part of the display 230. The support member 310 may include a bendable structure. For example, the support member 310 may include a structure in which a plurality of bars extending in a direction perpendicular (e.g., the Y-axis direction of FIG. 3B) to the sliding direction (e.g., the X-axis direction of FIG. 3B) are connected to one another along the sliding direction. In addition, the support member 310 may be configured in various bendable structures. For example, the support member 310 may be a bendable plate, and may have a structure including a plurality of grooves configured to enable bending. The support member 310 may be connected to the second housing 220 and slide with respect to the first housing 210 together with the second housing 220.

According to various embodiments, the display 230 may be a flexible display 230 that is bendable. In an embodiment, the display 230 may include a flexible substrate. For example, the display 230 may include a substrate formed of a polymer material made of a flexible material such as polyimide (PI) or polyethylene terephthalate (PET). In addition, the display 230 may include a substrate made of a very thin glass material. The display 230 may be supported by the second housing 220 and the support member 310, and the information display region 201 which is a part that is visible from the outside may increase or decrease through the sliding of the second housing 220 with respect to the first housing 210. In an embodiment, the display 230 may further include a touch sensing circuit (e.g., a touch sensor). In addition, the display 230 may be coupled to or disposed adjacent to a pressure sensor capable of measuring the intensity (pressure) of a touch and/or a digitizer for detecting a magnetic field-type pen input device (e.g., a stylus pen). For example, the digitizer may include a coil member disposed on a dielectric substrate to detect the electromagnetic inductive resonance frequency applied from the pen input device.

According to various embodiments, a rear cover 320 may be coupled to the first housing 210 to configure the rear external appearance of the electronic device 200. For example, as shown in FIG. 3B, the rear cover 320 may be coupled to the first housing 210 in the Z-axis direction of FIG. 3B. The rear cover 320 may be formed of a transparent, opaque, or translucent material.

According to various embodiments, a fixing device 291 for fixing the external device 250 received in the receiving space 241 to the receiving space 241 may be disposed in the receiving space 241 as shown in FIG. 3C. For example, as shown in FIGS. 3C and 3D, the fixing device 291 may be a magnet or a magnetic material 291 coupled to a magnetic material or a magnet 251 included in the external device 250 through magnetic force.

According to another embodiment, a receiving identification sensor 292 for detecting whether the external device 250 has been received in the receiving space 241 may be disposed in the receiving space 241. For example, the receiving identification sensor 292 may be a Hall sensor 292 configured to detect a change in a magnetic field. The Hall sensor 292 may detect whether the external device 250 is received by detecting a magnetic field that changes according to the withdrawal of the external device 250.

In the following description, the same reference numerals are used for the same or similar components as those described in FIGS. 2A, 2B, 3A, and 3B, except where otherwise noted. In addition, duplicate descriptions of the above-described components may be omitted if necessary.

Figure 4A:
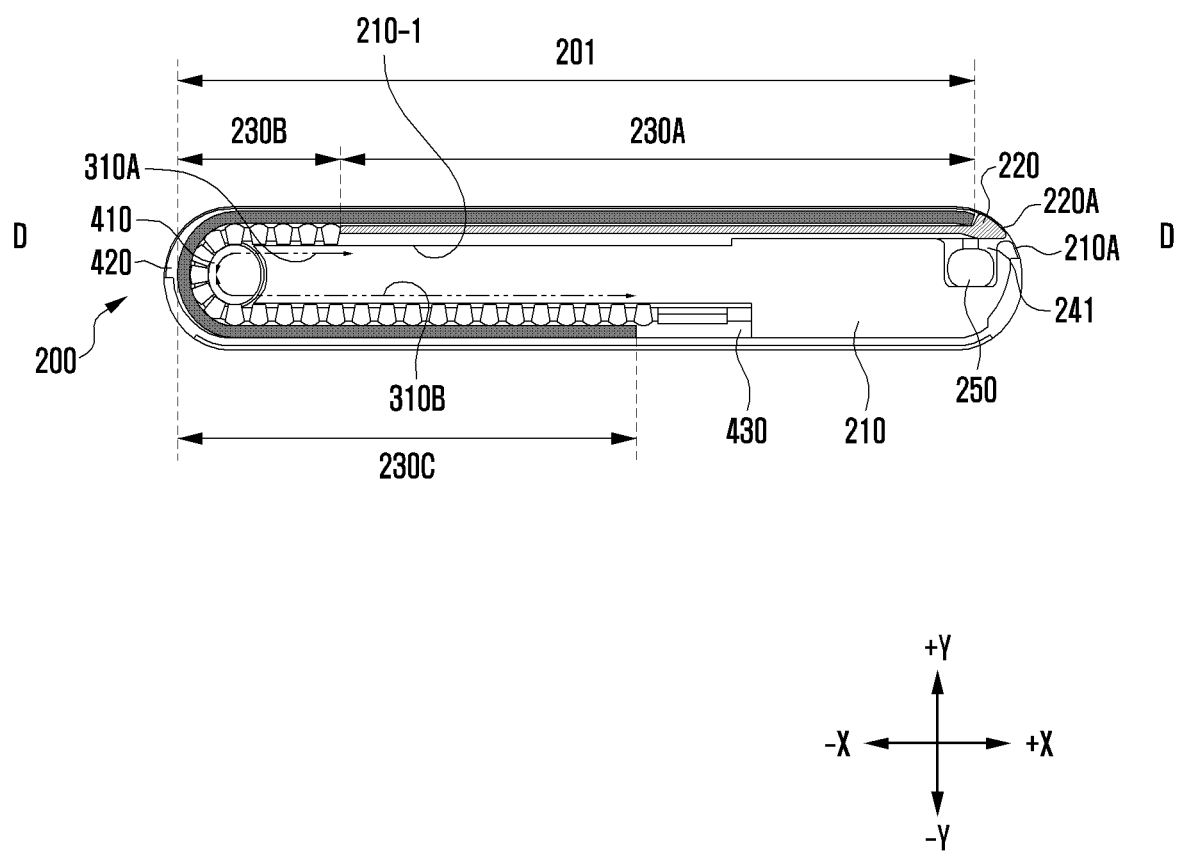
FIG. 4A is a cross-sectional view of the electronic device shown in FIG. 2A, taken along line D-D according to an embodiment of the disclosure.

FIG. 4A is a cross-sectional view of the electronic device shown in FIG. 2A, taken along line D-D according to an embodiment of the disclosure.

Figure 4B:
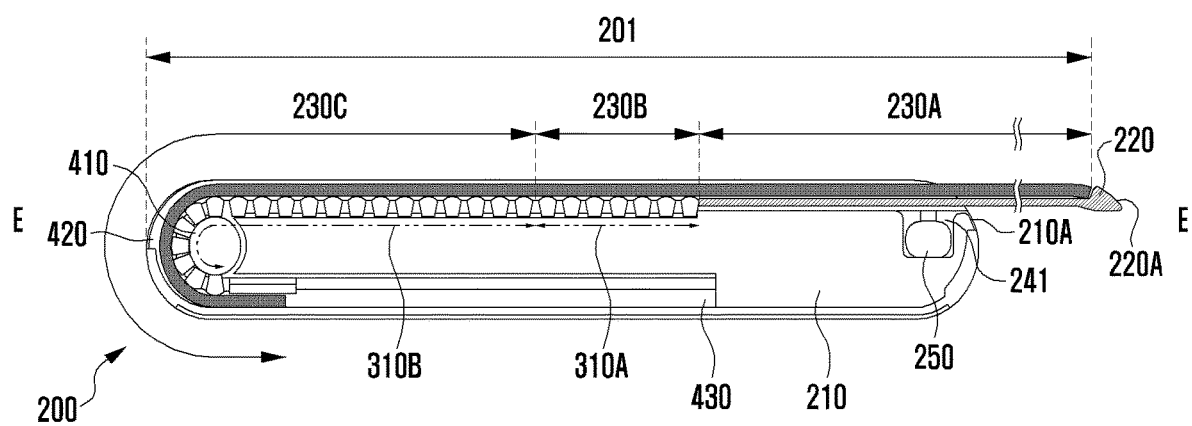
FIG. 4B is a cross-sectional view of the electronic device shown in FIG. 2B, taken along line E-E according to an embodiment of the disclosure.

FIG. 4B is a cross-sectional view of the electronic device shown in FIG. 2B, taken along line E-E according to an embodiment of the disclosure.

Figure 4C:
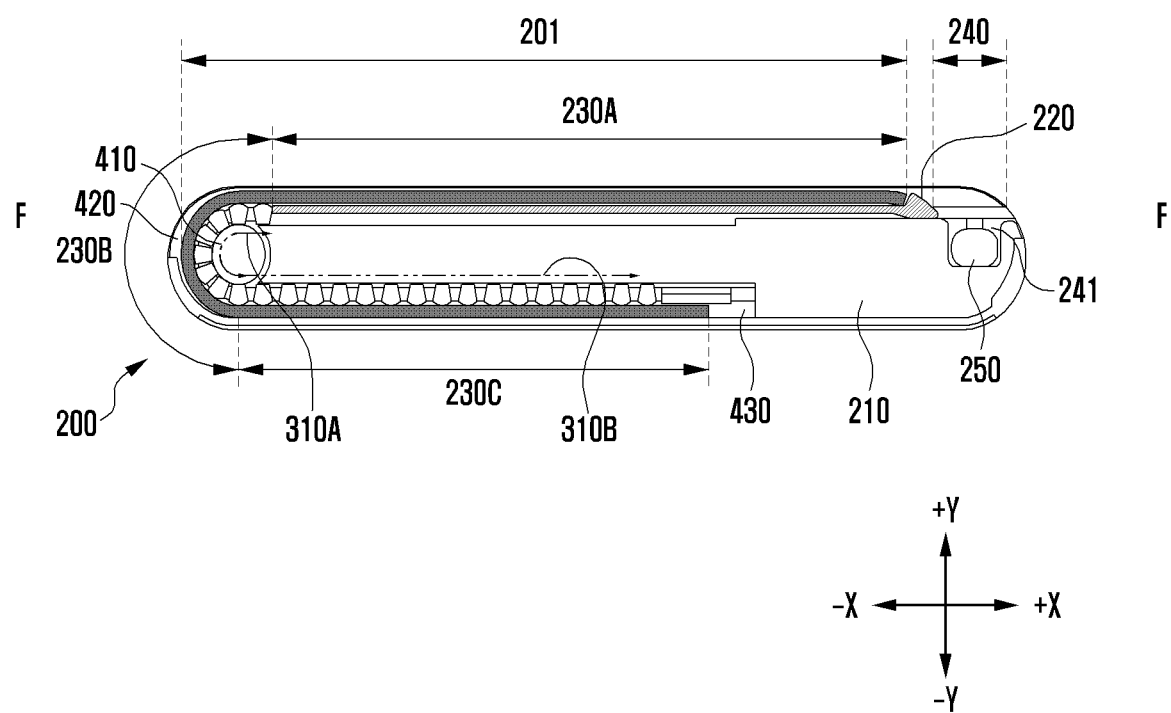
FIG. 4C is a cross-sectional view of the electronic device shown in FIG. 2C, taken along line F-F according to an embodiment of the disclosure.

FIG. 4C is a cross-sectional view of the electronic device shown in FIG. 2C, taken along line F-F according to an embodiment of the disclosure.

According to various embodiments, the display 230 may be divided into a plurality of regions. For example, the display 230 may include a first region 230A, a second region 230B, and a third region 230C. The second region 230B may be a region connected to the first region 230A, and the third region 230C may be a region connected to the second region 230B. The first region 230A of the display 230 may be a region supported by the second housing 220, the second region 230B may be a region supported by a first support part 310A of the support member 310, and the third region 230C may be a region supported by a third support part of the support member 310. Each divided region of the display 230 is merely for convenience of description, and may be a region which is not visually distinct in effect.

According to various embodiments, the second housing 220 may be at the reference position in the reference state as illustrated in FIG. 4A. The end 220A of the second housing 220 may be substantially aligned with the end 210A of the first housing 210 at the reference position. In this state, the first region 230A and the second region 230B of the display 230 may configure the information display region 201. The information display region 201 may refer to a region of the display 230 visible to the outside of the electronic device 200. For example, the information display region 201 may be a part excluding a part that is covered by the first housing 210 in the reference state and thus is not visible to the outside of the electronic device 200. In the reference state, the third region 230C of the display 230 may be received in a receiving space 430 included in the first housing 210.

According to various embodiments, in the reference state, at least a part of the first support part 310A of the support member 310 supporting the second region 230B of the display 230 may be disposed on a first surface 210-1 of the first housing 210. The first surface 210-1 of the first housing 210 may refer to a surface facing the second housing 220.

According to various embodiments, when the second housing 220 slides in the first direction (e.g., the +X direction in FIGS. 4A to 4C) at the reference position, a part of the third region 230C received in the receiving space 430 may be visible to the outside. The bendable support member 310 may be bent along the roller 410. The support member 310 connected to the second housing 220 may move by sliding of the second housing 220 in the first direction. As the second support part 310B of the support member 310 is moved in a direction coming out of the receiving space 430 through the space of a recess 420 between the first housing 210 and the roller 410, the third region 230C supported by the second support part 310B may be visible to the outside of the electronic device 200. As described above, when the second housing 220 slides in the first direction, at least a part of the first region 230A, the second region 230B, and the third region 230C of the display 230 may form the information display region 201.

According to various embodiments, when the second housing 220 slides in the second direction (e.g., the −X direction in FIGS. 4A to 4C) at the reference position, a part of the second region 230B of the display 230 may be received in the receiving space 430. The support member 310 connected to the second housing 220 may also move by sliding of the second housing 220. The first support part 310A of the support member 310 supporting the second region 230B may be bent along the roller 410 and support the second region 230B. The second region 230B may be bent together when the first support part 310A is bent. As the first support part 310A of the support member 310 bendable along the roller 410 supports the second region 230B, a part of the second region 230B may be received in the receiving space 430 when the second housing 220 slides in the second direction. The second region 230B may enter the receiving space 430 through the space of the recess 420 between the first housing 210 and the roller 410.

According to various embodiments, when the second housing 220 slides in the second direction at the reference position, the hidden region 240 between the first housing 210 and the second housing 220 may be exposed the outside of the electronic device 200. When the electronic device 200 is in the reference state or the first state, the hidden region 240 may be covered by the second housing 220 so as not to be visible from the outside. In an embodiment, as shown in FIG. 4C, the receiving space 241 may be disposed in the hidden region 240 of the first housing 210. The external device 250 may be received in the receiving space 241.

Figure 5A:
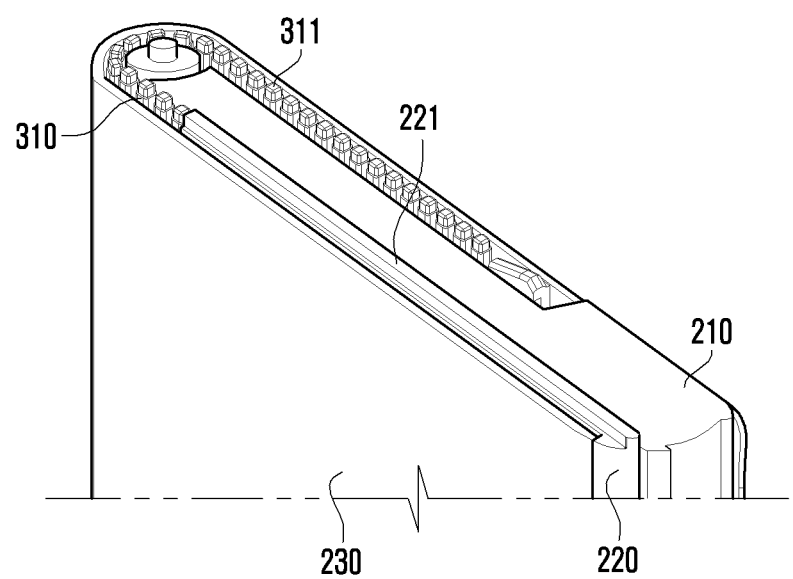
FIGS. 5A and 5B illustrate the relationship between a second housing and a guide rail of a support member according to various embodiments of the disclosure.
Figure 5B:
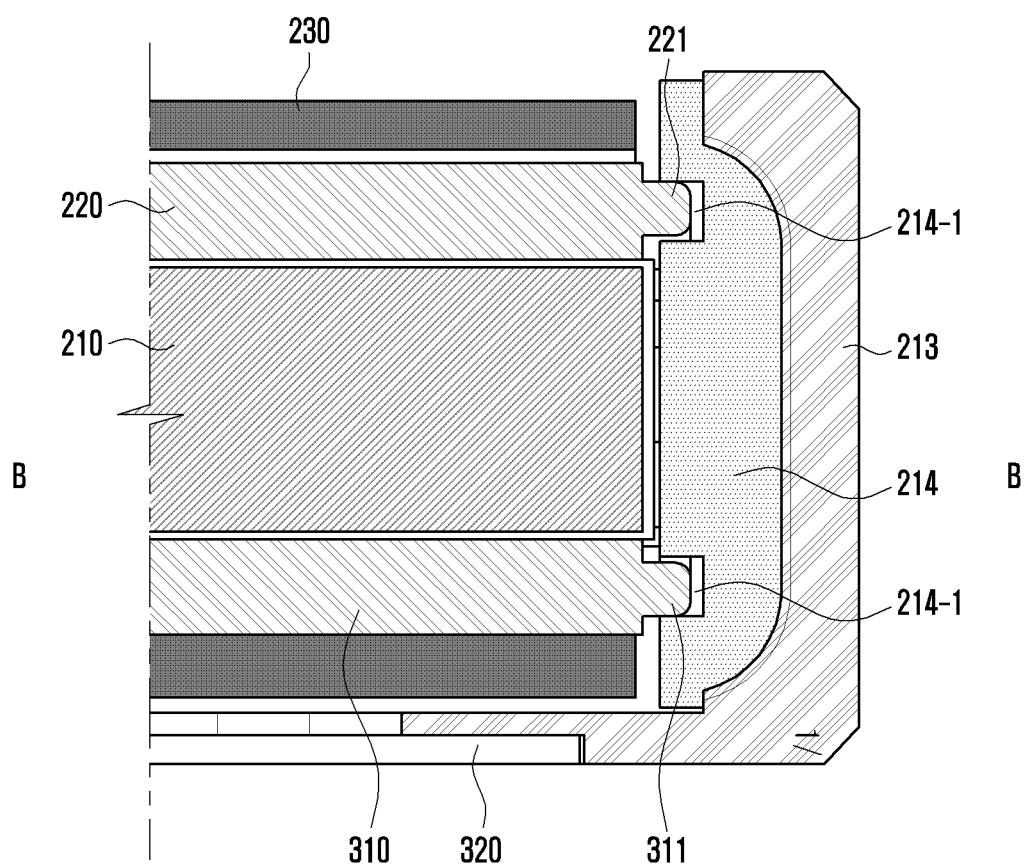

FIGS. 5A and 5B illustrate the relationship between a second housing and a guide rail of a support member according to various embodiments of the disclosure.

FIG. 5B is a cross-sectional view of the electronic device shown in FIG. 2A, taken along line B-B.

According to various embodiments, guide protrusions 221 and 311 may be disposed on lateral surfaces (or both ends) of the second housing 220 and the support member 310, respectively. Although one lateral surface of the second housing 220 and the support member 310 is shown in FIG. 5A, the guide protrusions 221 and 311 may be configured on the opposite lateral surface as well. The guide protrusions 221 and 311 may be inserted into the guide rail 214-1 configured in the guide housing 214. When the guide protrusions 221 and 311 are inserted into the guide rail 214-1, the guide protrusions 221 and 311 may move along the guide rail 214-1. The second housing 220 and the support member 310 including the guide protrusions 221 and 311 may move along the guide rail 214-1.

According to various embodiments, when the second housing 220 and the support member 310 connected to the second housing 220 are moved according to the sliding of the second housing 220 in the first direction or the sliding of the second housing 220 in the second direction, the movement may be guided according to the guide rail 214-1 of the guide housing 214.

FIGS. 6A to 6D illustrate an electronic device according to various embodiments of the disclosure.

Figure 6A:
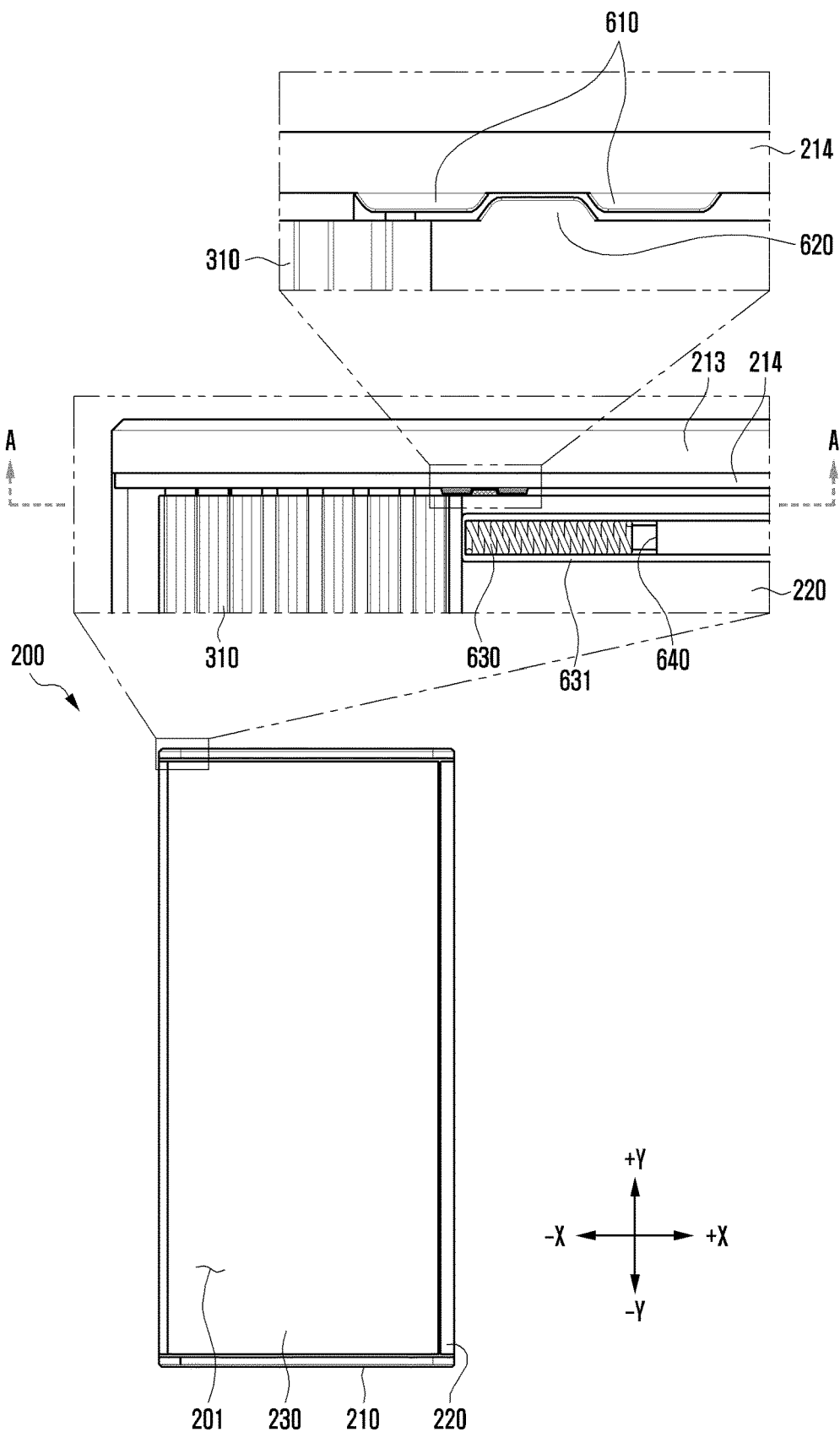
FIGS. 6A, 6B, 6C, and 6D illustrate an electronic device according to various embodiments of the disclosure.
Figure 6B:
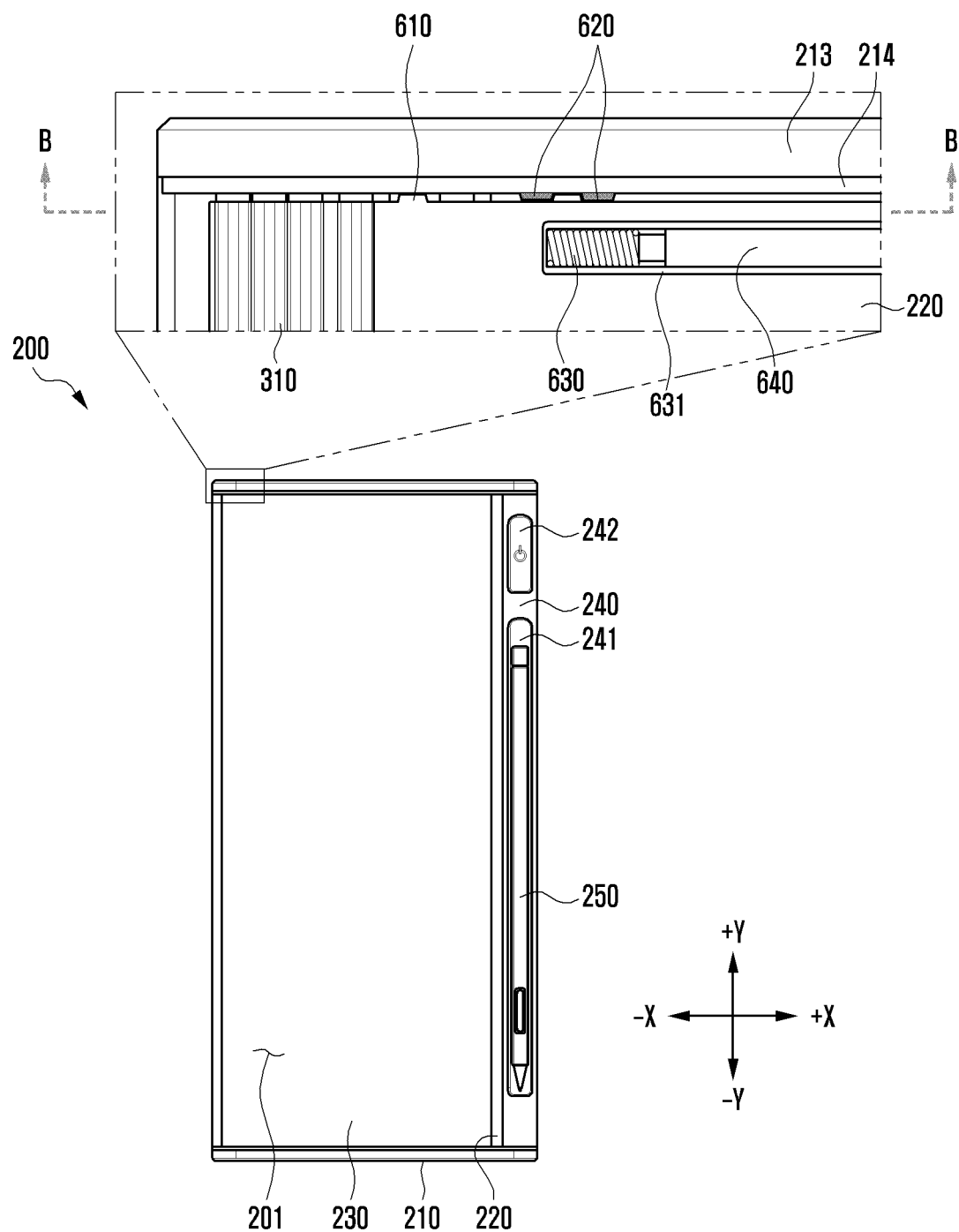
Figure 6C:
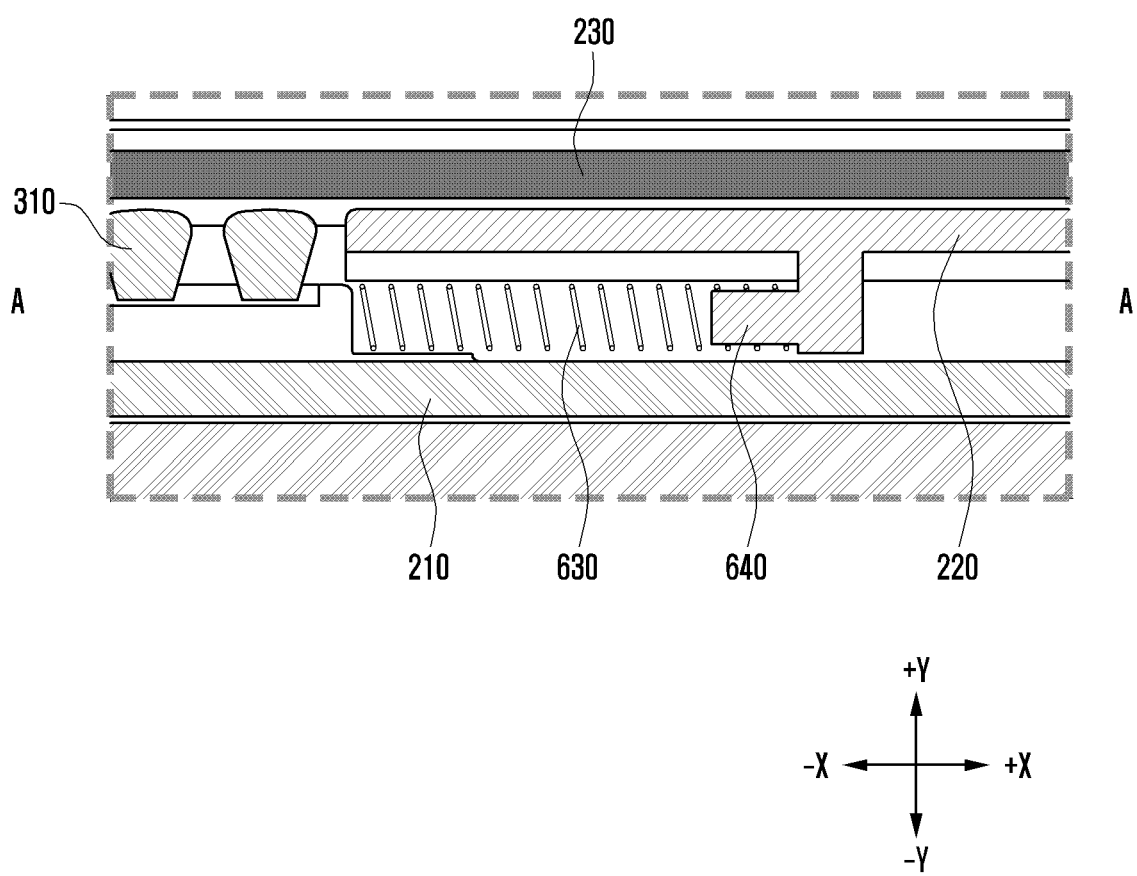
Figure 6D:
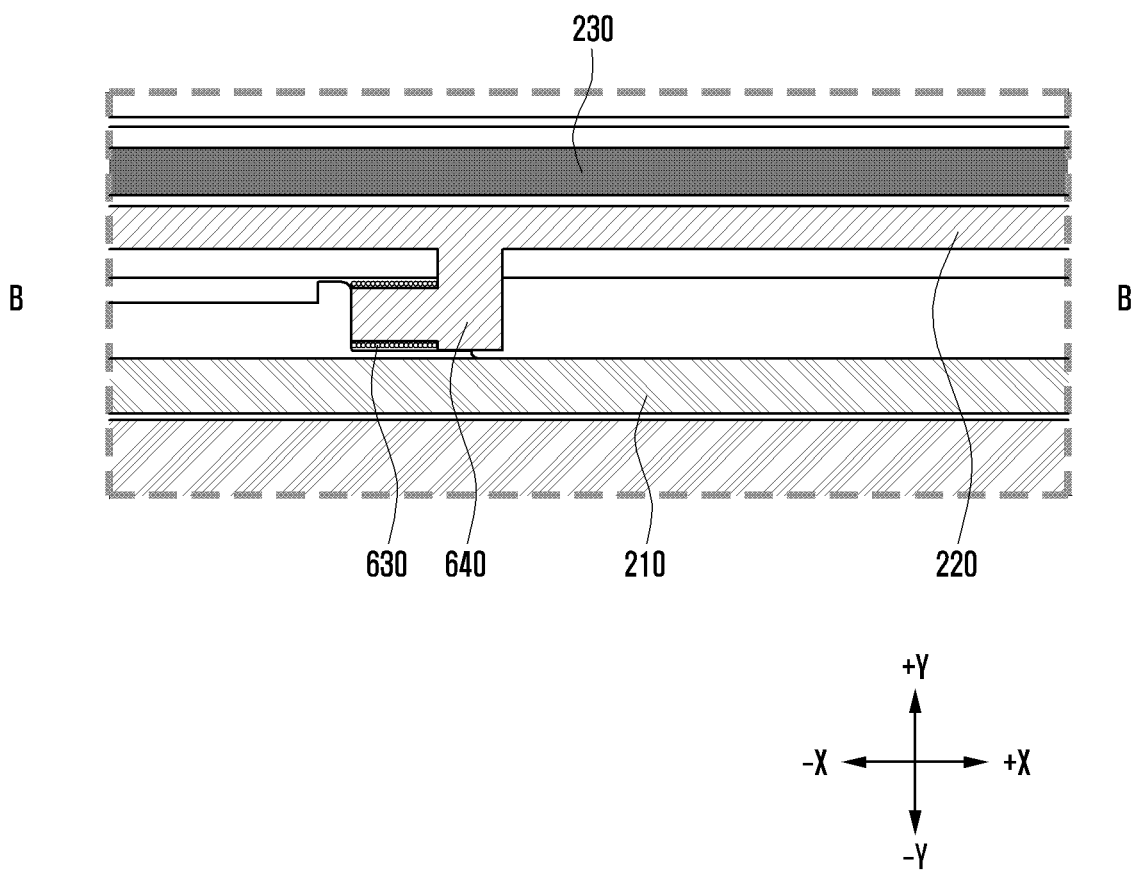

FIG. 6C is a cross-sectional view of the electronic device illustrated in FIG. 6A, taken along line A-A, and FIG. 6D is a cross-sectional view of the electronic device illustrated in FIG. 6B, taken along line B-B.

The electronic device 200 described in FIGS. 6A to 6D is similar to the electronic device 200 described above, but may further include a configuration for fixing the second housing 220 to the reference position, and a configuration for returning the second housing 220 to the reference position. Hereinafter, components that have not been described above will be mainly described.

According to various embodiments, an elastic member 630 may be disposed between the first housing 210 and the second housing 220. For example, as shown in FIG. 6A, between the first housing 210 and the second housing 220, an elastic guide 631 on which an elastic member 630 is disposed may be disposed on the first housing 210. When a contact part 640 disposed on the second housing 220 is inserted and slides into the elastic guide 631, the contact part 640 may deform the elastic member 630. In an embodiment, when the second housing 220 slides in the second direction (e.g., the −X direction in FIGS. 6A to 6D) at the reference position, the contact part 640 may press the elastic member 630. The elastic member 630 pressed by the contact part 640 may be elastically deformed. The elastically deformed elastic member 630 may provide an elastic force to the contact part 640 in the first direction (e.g., the +X direction of FIGS. 6A to 6D). Accordingly, the second housing 220 receives an elastic force in the first direction by the elastically deformed elastic member 630. When the external force for sliding the second housing 220 in the second direction is removed, the second housing 220 may slide in the first direction by the elastic force provided by the elastic member 630.

As described above, due to the elastic member 630 disposed between the first housing 210 and the second housing 220, the second housing 220 slid in the second direction at the reference position may automatically slide again in the first direction when the external force for sliding the second housing 220 in the second direction is removed. When the second housing 220 slid in the second direction slides in the first direction, the second housing 220 may be aligned at the reference position. For example, the second housing 220 may be stopped at the reference position by the structure of the first protrusion 610—the second protrusion 620 to be described below.

According to various embodiments, the first protrusion 610 may be disposed on the first housing 210, and the second protrusion 620 may be disposed on the second housing 220. For example, the first protrusion 610 may be disposed on a guide housing 214 of the first housing 210. The second protrusion 620 may be disposed on each of the opposite lateral surfaces (e.g., the +Y direction and −Y direction in FIGS. 6A to 6D) of the second housing 220 perpendicular to the sliding direction (e.g., the X-axis direction of FIGS. 6A to 6D) of the second housing 220, and the first protrusion 610 of the first housing 210 may also be disposed on the first housing 210 at a position corresponding to the second protrusion 620.

In an embodiment, when the second housing 220 is at the reference position, the second protrusion 620 may be caught by the first protrusion 610. The second housing 220 may stop with respect to the first housing 210 in a state in which the second protrusion 620 is caught by the first protrusion 610. In this state, the second protrusion 620 may be maintained in a state where the same is caught by the first protrusion 610 until an external force of a certain level or more is applied to the second housing 220. The second housing 220 may be aligned at the reference position by the structure of the first protrusion 610 and the second protrusion 620 described above.

According to various embodiments, at least one of the second protrusion 620 or the first protrusion 610 may be drawn out with respect to the first housing 210 or the second housing 220 in the protruding direction (e.g., the Y-axis direction in FIGS. 6A and 6B). For example, when an external force of a certain level or more is applied to the second housing 220, the second protrusion 620 or the first protrusion 610 may be introduced into the first housing 210 or the second housing 220, and thus the fixing structure of the second protrusion 620 and the first protrusion 610 may be released.

One lateral surface (e.g., the lateral surface in the +Y direction in FIGS. 6A and 6B) of the electronic device 200 has been described in the above drawings, but the other lateral surface (e.g., the lateral surface in the −Y direction in FIGS. 6A and 6B) of the electronic device 200 may also include the structure described above.

Figure 7:
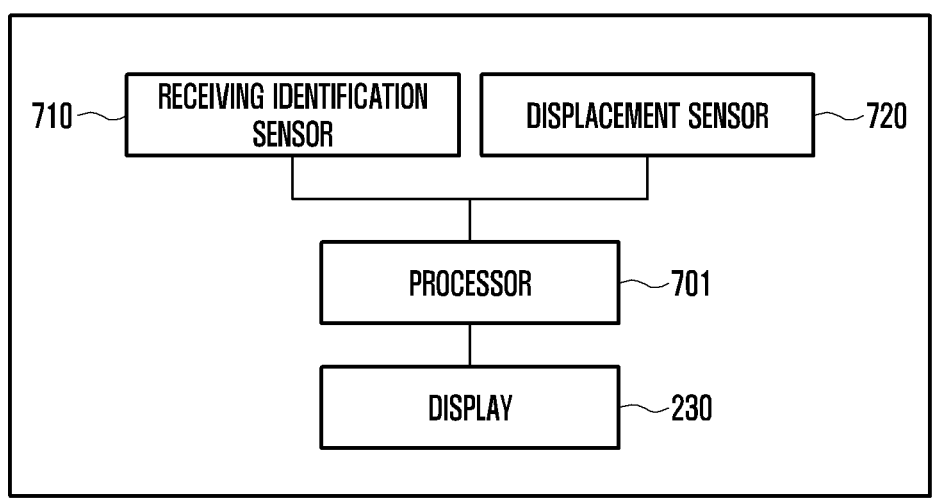
FIG. 7 is a block diagram of an electronic device according to an embodiment of the disclosure.

FIG. 7 is a block diagram of an electronic device according to an embodiment of the disclosure.

According to various embodiments, the electronic device may include a display 230, a displacement sensor 720, a receiving identification sensor 710, and a processor 701 (e.g., the processor 120 of FIG. 1).

According to various embodiments, the displacement sensor 720 may be a sensor configured to detect movement or sliding displacement of the second housing 220 with respect to the first housing 210. Since the information display region 201 of the display 230 increases or decreases according to the sliding of the second housing 220, the displacement sensor 720 may detect the increase or decrease of the information display region 201 of the display 230. In an embodiment, the displacement sensor 720 may be a sensor configured to generate a signal according to the sliding of the second housing 220 with respect to the first housing 210. For example, the displacement sensor 720 may be a sensor such as a linear scale that generates a signal according to the mechanical movement of the second housing 220 or a Hall sensor that detects a change in a magnetic field. In case that the displacement sensor 720 is a Hall sensor, a magnetic material may be disposed in the second housing 220 or the first housing 210 so that a magnetic field is changed according to the sliding of the second housing 220, and the Hall sensor may be disposed at a position corresponding to a magnetic material.

According to various embodiments, the receiving identification sensor 710 (e.g., the receiving identification sensor 292 of FIG. 3D) may be a sensor for detecting whether an external device received in the receiving space 241 configured in the hidden region 240 is received. For example, the receiving identification sensor 710 may be a Hall sensor that detects a change in a magnetic field. When the external device is received, a change in the magnetic field around the receiving space may occur, and the receiving identification sensor 710 may detect the change.

According to various embodiments, the processor 701 may control various electronic components included in the electronic device so that the electronic device can perform various operations. The processor 701 may perform various operations by processing information according to a specific signal or input. Here, the operation performed by the processor 701 may include various functions or commands (e.g., content playback, application execution, camera driving, information display through the display 230, etc.) that may be performed through various electronic components included in the electronic device.

The processor 701, the displacement sensor 720, and the receiving identification sensor 710 to be mentioned below will use the reference numerals of FIG. 7.

Figure 8A:
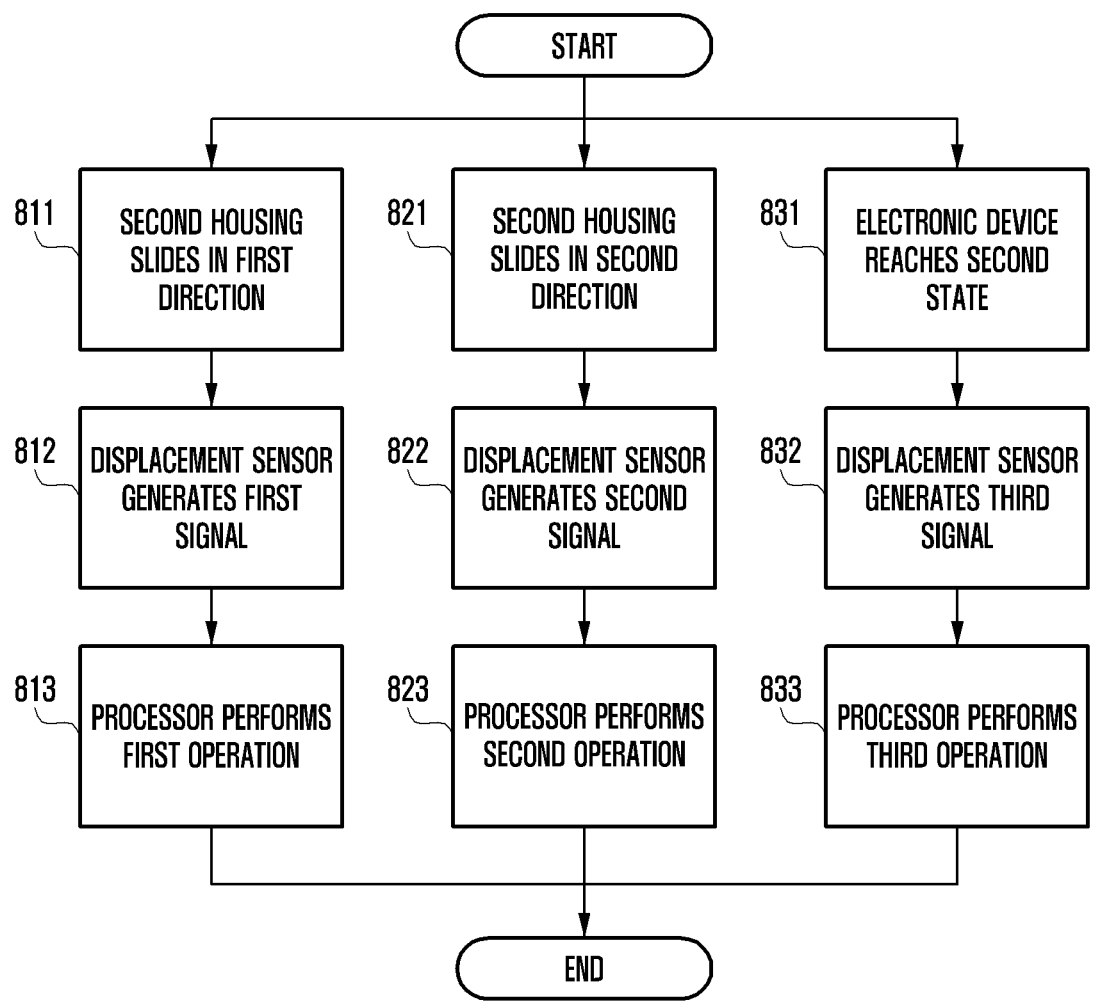
FIG. 8A is a flowchart of operations of an electronic device according to an embodiment of the disclosure.

FIG. 8A is a flowchart of operations of an electronic device according to an embodiment of the disclosure.

Figure 8B:
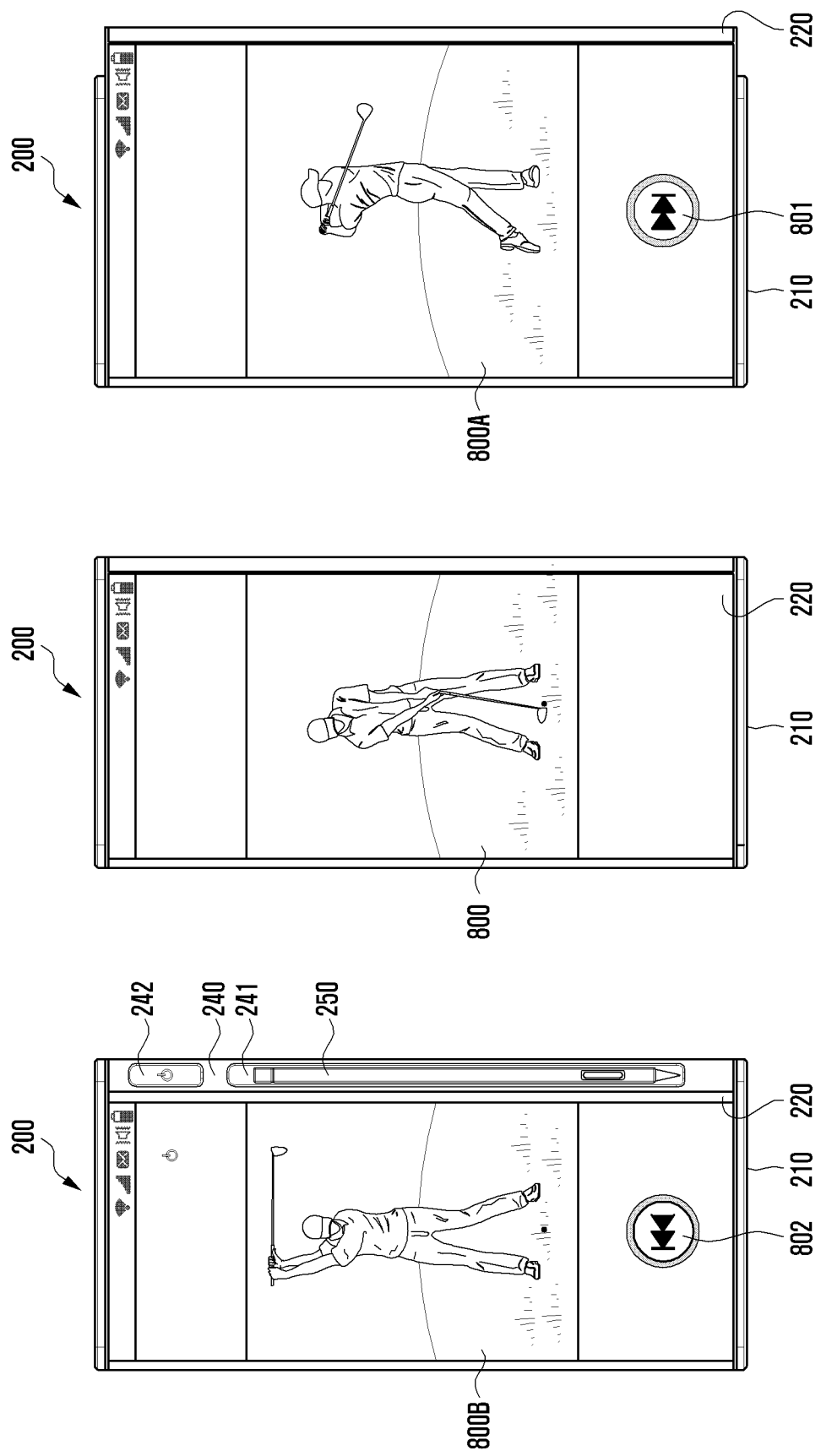
FIG. 8B illustrates one of the operations of an electronic device according to an embodiment of the disclosure.

FIG. 8B illustrates one of the operations of an electronic device according to an embodiment of the disclosure.

According to various embodiments, the displacement sensor 720 may generate a first signal at operation 812 when the second housing 220 slides in the first direction at operation 811 at the reference position. In addition, the displacement sensor 720 may generate a second signal at operation 822 when the second housing 220 slides in the second direction at operation 821 at the reference position. The first signal and the second signal may be distinguishable from each other.

According to various embodiments, the processor 701 may perform various operations according to a signal generated by the displacement sensor 720. In an embodiment, the processor 701 may receive a first signal generated by the displacement sensor 720 to perform a first operation at operation 813, and receive a second signal to perform a second operation at operation 823. The first operation and the second operation may be different operations. The first operation and the second operation may be an operation configured when the electronic device is manufactured or an operation arbitrarily designated by a user. In addition, the first operation and the second operation may differ depending on an application executed in the electronic device. For example, the first operation and the second operation may be operations of executing a specific application (a camera-related application, an audio-related application, a content reproduction application, an Internet browsing application, etc.). In addition, the first operation and the second operation may be an operation of performing various functions (e.g., driving a camera, playing audio, playing content, activating a flash, activating wireless communication, changing a sound mode, etc.) of the electronic device. The above-described operation is merely an example, and in addition, the first operation and the second operation may be various operations within the range that those skilled in the art can understand.

In an embodiment, the first operation and the second operation may correspond to each other. For example, as shown in FIG. 8B, while the content 800 playback application is being executed, the first operation may be a command instructing the fast forward 801 playback. When the fast forward is performed, the next scene 800A of the currently displayed content 800 may be displayed. The second operation may be a command instructing the rewind 802 playback. When the rewind is performed, the previous scene 800B of the currently displayed content 800 may be displayed.

In another embodiment, while the content playback application is being executed, the first operation may be a command instructing to reproduce the next content, and the second operation may be a command instructing to reproduce the previous content. In addition, while a camera-related application is being executed, the first operation may be a command instructing photographing through a front camera, and the second operation may be a command instructing photographing through a rear camera. In addition, while the Internet browsing application is being executed, the first operation may be a command for forward, and the second operation may be a command for rewind. In addition, while a cursor is being displayed on the screen, the first operation may be a command for moving the cursor forward, and the second operation may be a command for moving the cursor backward.

According to various embodiments, the displacement sensor 720 may generate a third signal at operation 832 when the second housing 220 slides in the second direction to be in the second state (e.g., the state illustrated in FIG. 2C) at operation 831. The processor 701 may receive a third signal and perform a third operation at operation 833 distinguished from the first operation and the second operation.

In an embodiment, the displacement sensor 720 may generate a different signal according to the movement speed of the second housing 220. For example, the displacement sensor 720 may generate a first movement signal in case that the movement speed of the second housing 220 is equal to or less than a preconfigured movement speed, and may generate a second movement signal in case that the movement speed of the second housing 220 is greater than the preconfigured movement speed. The processor 701 may perform different operations according to the first movement signal and the second movement signal. It has been described that the first operation and the second operation are performed based on the movement of the second housing 220 in a specific direction (e.g., a first direction (e.g., the +X direction in FIG. 2A) or a second direction (e.g., the −X direction in FIG. 2B)). When the displacement sensor 720 generates a signal that is different according to the movement speed of the second housing 220, the processor 701 may perform an operation different according to the fast or slow movement in the first direction, and the processor 701 may perform an operation different according to the fast or slow movement in the second direction.

Figure 9A:
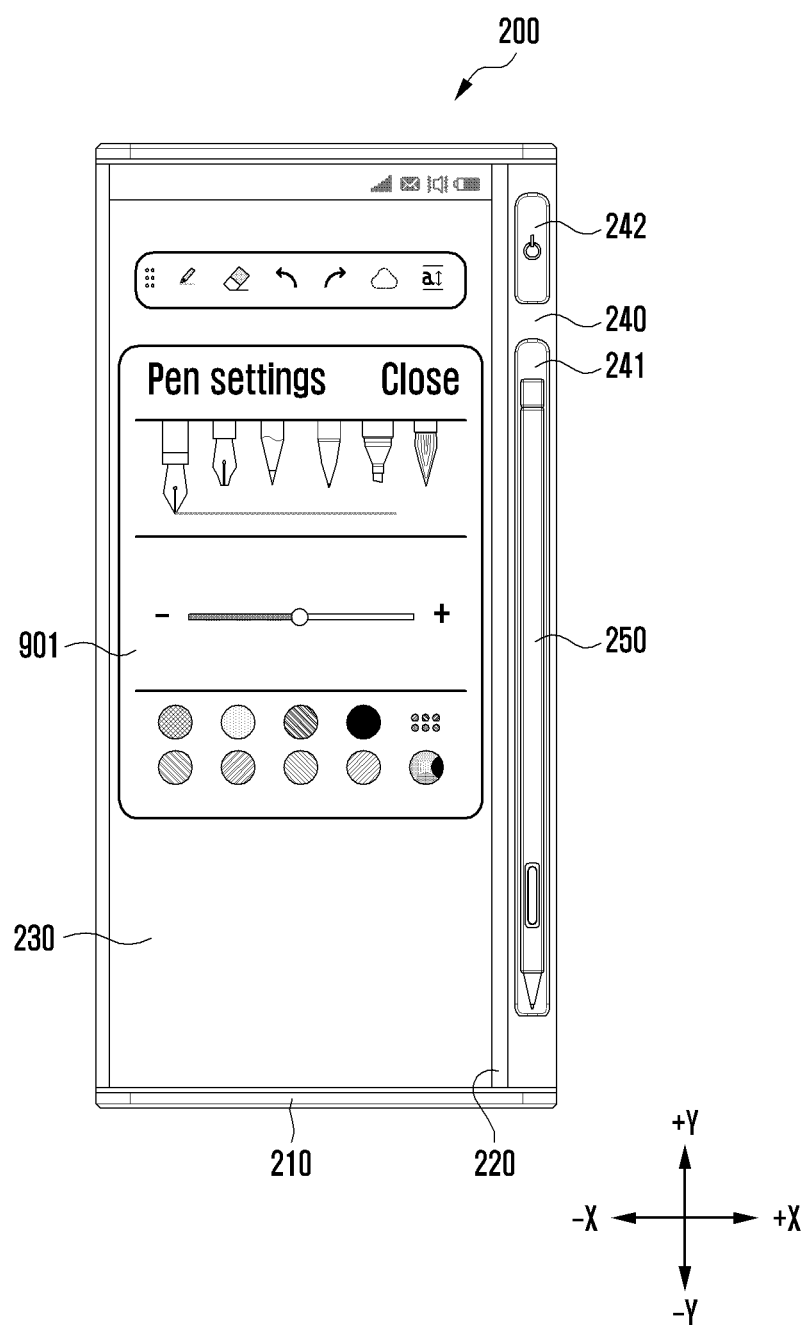
FIGS. 9A and 9B illustrate examples of an external device received in a hidden region according to various embodiments of the disclosure.
Figure 9B:
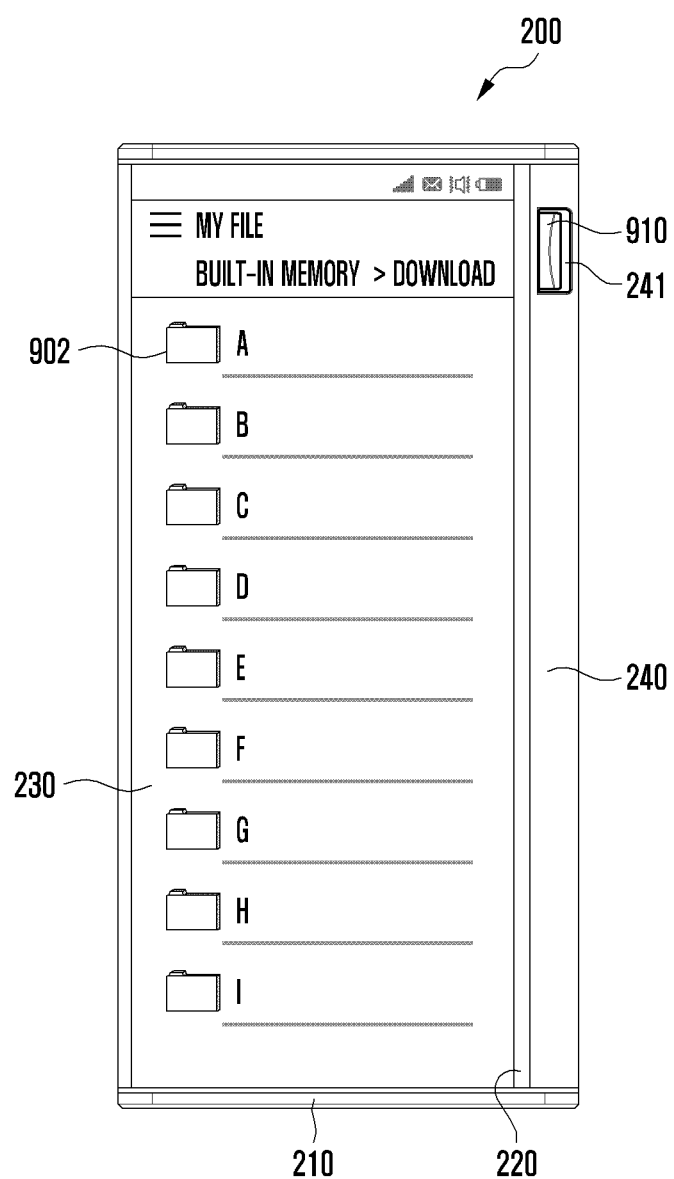

FIGS. 9A and 9B illustrate examples of an external device received in a hidden region according to various embodiments of the disclosure.

Figure 9C:
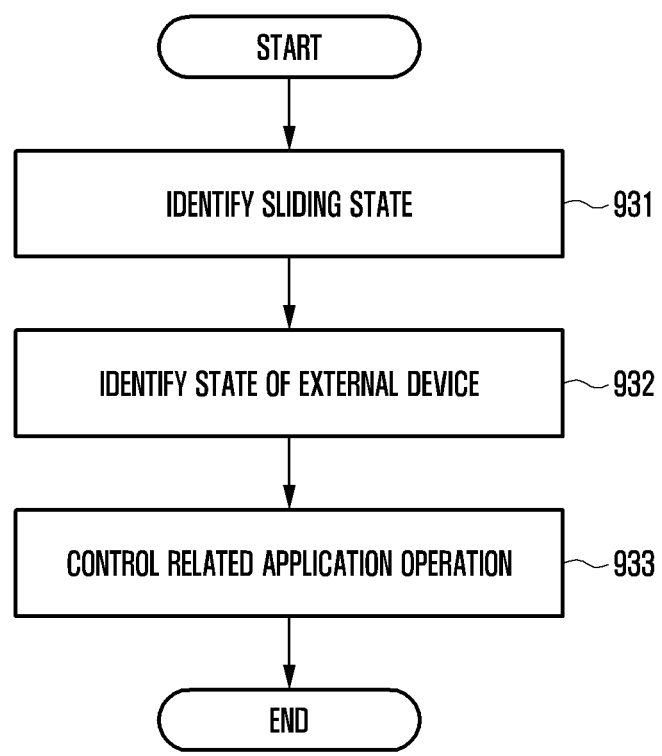
FIG. 9C is a flowchart showing operations of an electronic device including a hidden region according to an embodiment of the disclosure.

FIG. 9C is a flowchart showing operations of an electronic device including a hidden region according to an embodiment of the disclosure.

Referring to FIGS. 9A and 9B, when the second housing 220 slides in the second direction (e.g., the −X direction of FIGS. 9A and 9B), the hidden region 240 may be exposed to the outside, and the receiving space 241 configured in the hidden region 240 may be exposed to the outside. Various types of external devices may be received in the receiving space 241.

In an embodiment, the processor 701 may perform an operation preconfigured according to the type of an external device received in the receiving space 241, based on at least one of the second signal and the third signal. Here, the second signal and the third signal may be signals generated by the displacement sensor 720 described with reference to FIGS. 7 and 8A. The second signal may be a signal generated by the displacement sensor 720 when the second housing 220 slides in the second direction, and the third signal may be a signal generated by the displacement sensor 720 when the second housing 220 slides in the second direction to be in the second state.

For example, in case that the external device received in the receiving space 241 is a pen input device (e.g., the stylus pen 250), the processor 701 may perform an operation of executing an application 901 related to the pen input device (e.g., a writing application, a memo application, etc.), based on at least one of the second signal and the third signal.

As another example, in case that the external device received in the receiving space 241 is a storage device (e.g., micro SD or mini SD) 910, the processor 701 may perform an operation of executing an application 902 related to the storage device (e.g., a navigator application, a file management application, a content playback application, etc.), based on at least one of the second signal and the third signal.

As still another example, in case that the external device received in the receiving space 241 is a subscriber identification module (SIM) card, the processor 701 may perform an operation of executing an application related to the SIM card (e.g., a communication state configurating application, etc.), based on at least one of the second signal and the third signal.

In an embodiment, the processor 701 may perform an operation related to the external device according to whether the external device is received in the receiving space 241 from the receiving identification sensor 710. For example, in case that the external device is a pen input device 250, as the pen input device 250 is removed from the receiving space 241, an operation of executing the application 901 related to the pen input device 250 may be performed.

According to various embodiments, the processor 701 may identify the sliding state of the second housing 220. For example, the processor 701 may identify the second signal or the third signal to identify the sliding state at operation 931. In an embodiment, the processor 701 may identify the sliding state to identify whether the hidden region 240 is exposed to the outside and the receiving space 241 configured in the hidden region 240 is exposed to the outside. In a state in which the receiving space 241 is exposed to the outside, the processor 701 may identify states of various external devices at operation 932 received in the receiving space 241. Here, the state of the external device may include various states related to the operation of the external device, such as whether the external device is received in the receiving space 241, a charging state of the external device, and whether the external device operates normally. The processor 701 may identify the state of the external device to control (e.g., execute or terminate) the operation of the application related to the external device at operation 933. For example, in case that the external device is the pen input device 250, the processor 701 may identify whether the pen input device 250 is removed from the receiving space 241, and execute the application 901 related to the pen input device 250 (e.g., a writing application, a memo application) when the pen input device 250 is removed. The processor 701 may identify that the pen input device 250 is received in the receiving space 241, to terminate the application related to the pen input device 250. As another example, in case that the external device is the storage device 910, the processor 701 may identify that the storage device 910 has been received, to execute the application 902 related to the storage device (e.g., an explorer application, a file management application, a content playback application, etc.). The processor 701 may identify that the storage device 910 has been removed, to terminate the application related to the storage device.

The above-described embodiments are merely examples, and various other external devices may be received in the receiving space 241. In an embodiment, the external device may be electrically connected to the electronic device while being received in the receiving space 241. In this case, the processor 701 may identify the type of the external device by identifying the ID of the external device. The processor 701 may perform an operation preconfigured according to the second signal and the third signal, based on the type of the external device.

FIGS. 10A to 10F illustrate an operation of an electronic device according to an input/output device disposed in a hidden region according to various embodiments of the disclosure.

According to various embodiments, an input/output device may be disposed in the hidden region 240. The input/output device may refer to any type of device that inputs a specific signal or information to an electronic device or outputs a specific signal and information received from the electronic device. For example, the input/output device may include an audio device, a camera, a connector, a physical button, a virtual button, an auxiliary display, and the like.

Figure 10A:
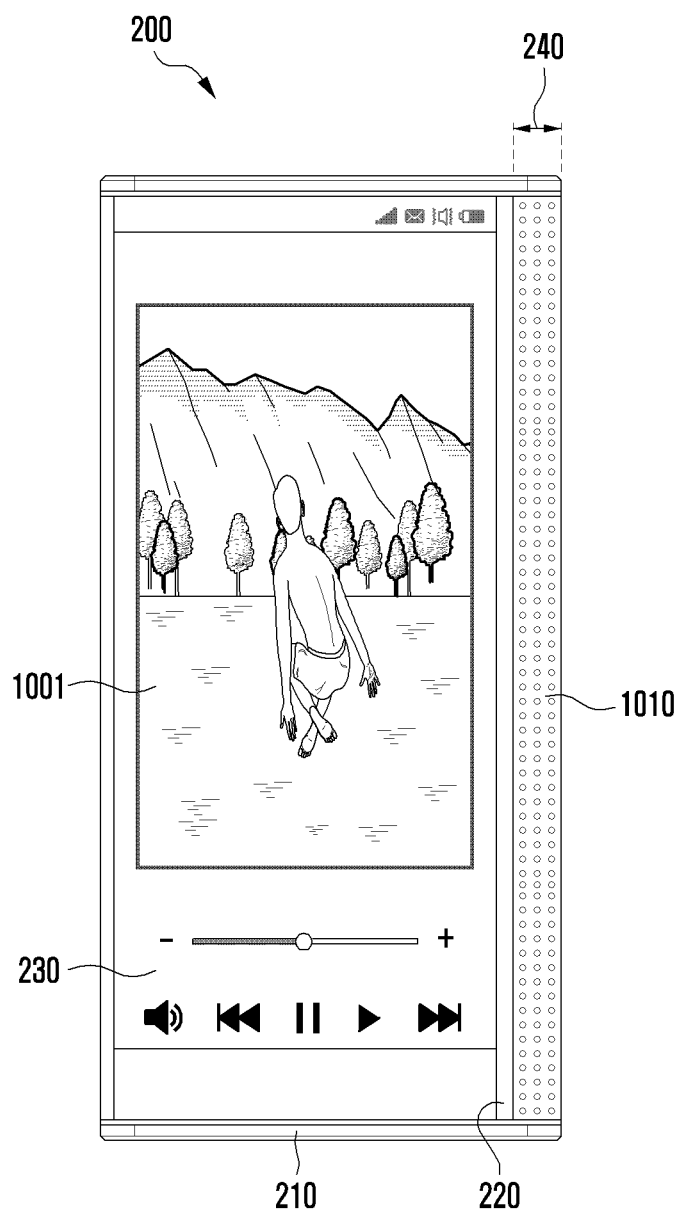
FIGS. 10A, 10B, 10C, 10D, 10E, and 10F are views showing operations of an electronic device according to an input/output device disposed in a hidden region according to various embodiments of the disclosure.

In an embodiment, the input/output device may be an audio device. Referring to FIG. 10A, a speaker 1010 may be disposed in the hidden region 240. Since the entire part of the hidden region 240 may be used as an output part, the speaker 1010 disposed in the hidden region 240 may have better performance than a speaker disposed in another region of the electronic device. The processor 701 may perform an operation of executing an application 1001 related to the audio device 1010 (e.g., a content reproduction application), based on at least one of the second signal and the third signal. In another embodiment, the processor 701 may change the sound output path so that the sound is output through the speaker 1010 disposed in the hidden region 240, based on at least one of the second signal and the third signal. In this case, the sound having been output through the speaker or earphone device disposed in another part of the electronic device may be output through the speaker disposed in the hidden region 240.

Figure 10B:
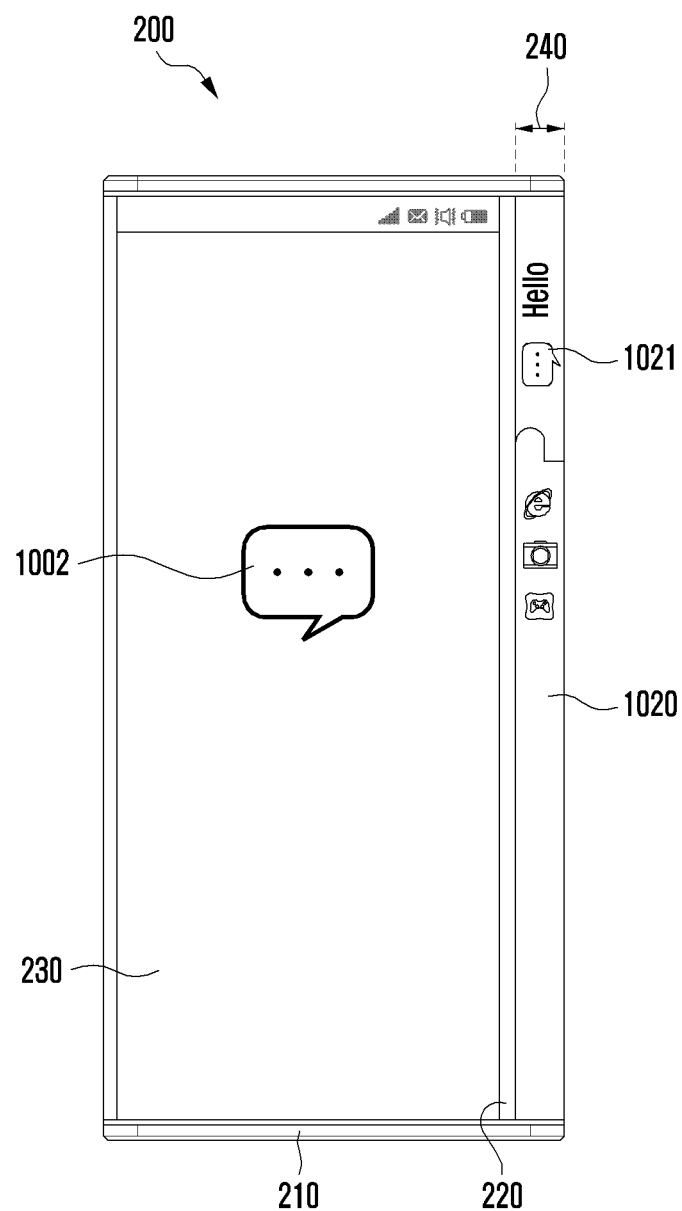
Figure 10C:
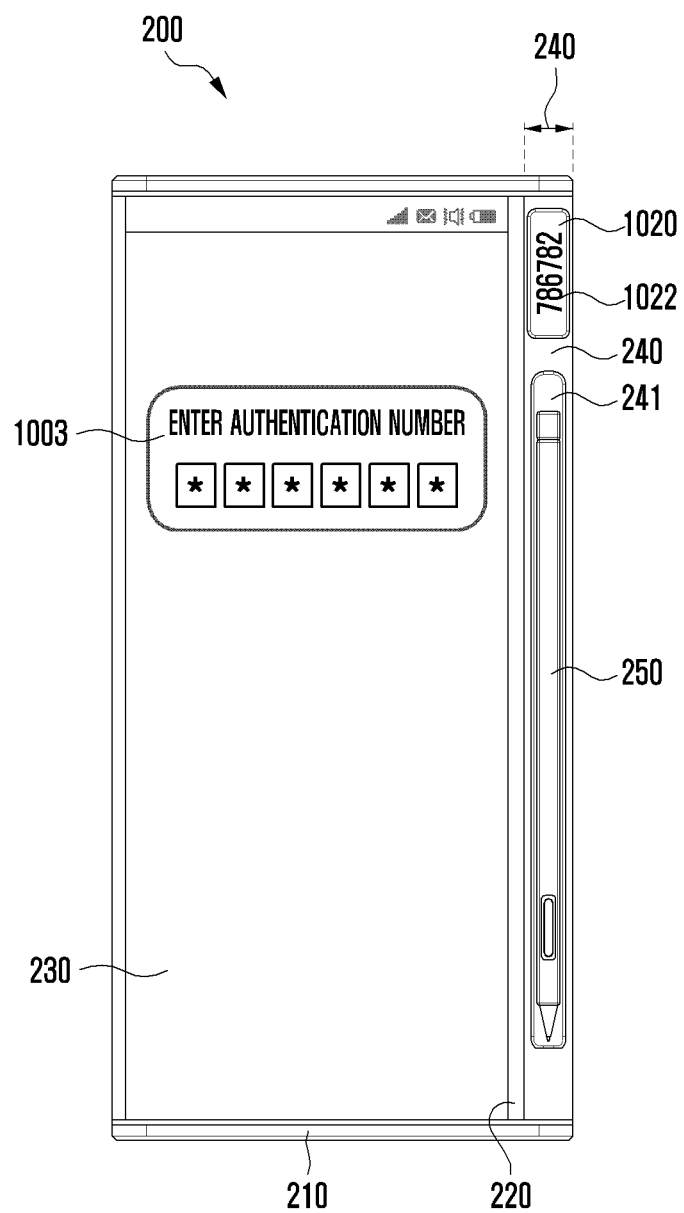

In one embodiment, the input/output device may be an auxiliary display. Referring to FIGS. 10B and 10C, the auxiliary display 1020 may be a display capable of displaying various types of information. The auxiliary display 1020 may be disposed on at least a part of the hidden region 240. The processor 701 may display information 1021 related to the information 1002 displayed on the display 230 on the auxiliary display 1020, based on at least one of the second signal and the third signal. For example, in case that a notification 1002 is displayed on the display, details 1021 of the notification may be displayed on the auxiliary display 1020 when the auxiliary display 1020 is exposed by the sliding of the second housing 220 in the second direction. As another example, in case that an authentication key (e.g., on time password) is requested from the running application 1003, the authentication key 1022 may be displayed on the auxiliary display 1020 when the auxiliary display 1020 is exposed by the sliding of the second housing 220 in the second direction. In an embodiment, the auxiliary display 1020 may be an e-paper display (EPD).

In an embodiment, the electronic device may include an authentication device (not shown) for identifying a user. The authentication device may include a device capable of recognizing various means (e.g., a password, a pattern, biometric information (e.g., fingerprint, face, iris, etc.)) for identifying a user. For example, the authentication device may include a touch sensor capable of receiving a password or a pattern, and a biometric sensor capable of identifying biometric information. The authentication device may identify a specific user and may generate an authentication signal when identification of the specific user is completed. The processor 701 may receive the authentication signal and control the input/output device disposed in the hidden region 240. For example, as described above, when the auxiliary display is disposed in the hidden region 240 and the authentication key is displayed, the processor 701 may control the auxiliary display, based on the reception of the authentication signal. This may block an unauthorized user from accessing the authentication key displayed on the auxiliary display.

In an embodiment, the electronic device may further include a locking device (not shown) for blocking sliding of the second housing with respect to the first housing. The locking device may include any of various mechanical means capable of blocking the sliding of the second housing. For example, the locking device may be a catch installed on a sliding path of the second housing. The processor 701 may release the locking device, based on the authentication signal generated by the authentication device. This may block an unauthorized user from accessing the hidden region 240.

Figure 10D:
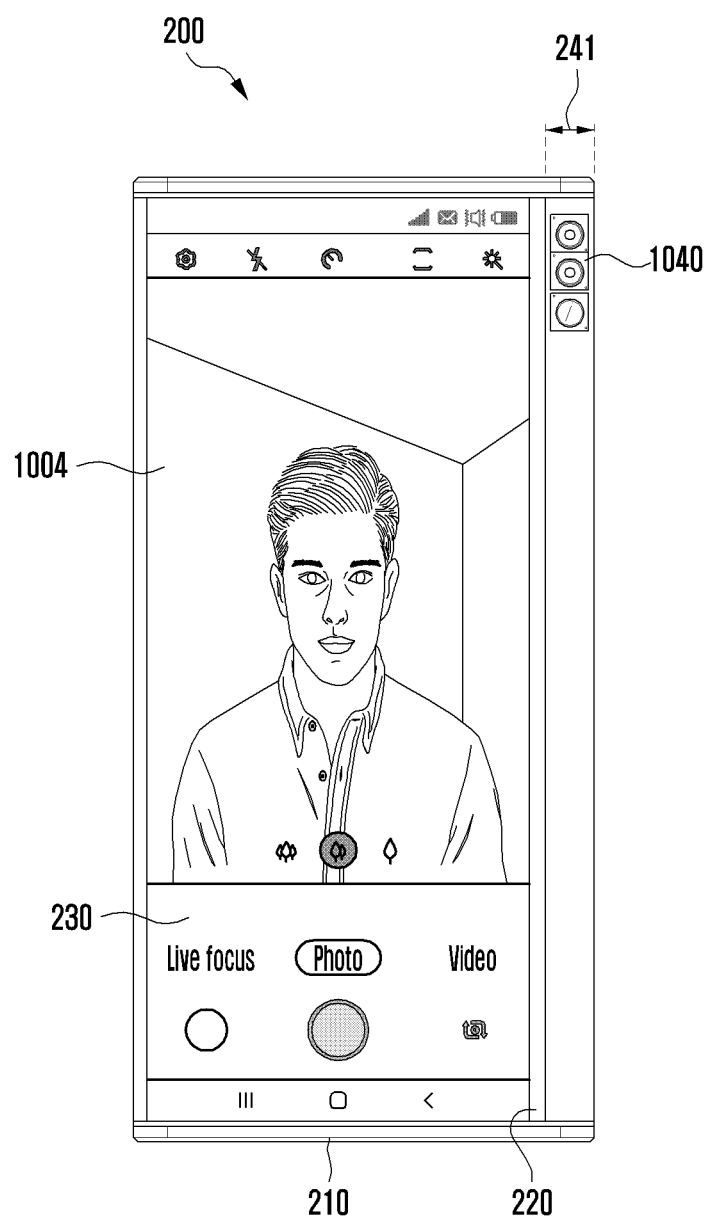

In an embodiment, the input/output device may be a camera. Referring to FIG. 10D, a camera 1040 may be disposed in the hidden region 240. The processor 701 may perform an operation of executing an application 1004 related to the camera 1040, based on at least one of the second signal and the third signal. At this time, the processor 701 may output an image captured by the camera 1040 disposed in the hidden region 240 as a preview screen such that shooting can be immediately performed by the camera 1040 disposed in the hidden region 240.

Figure 10E:
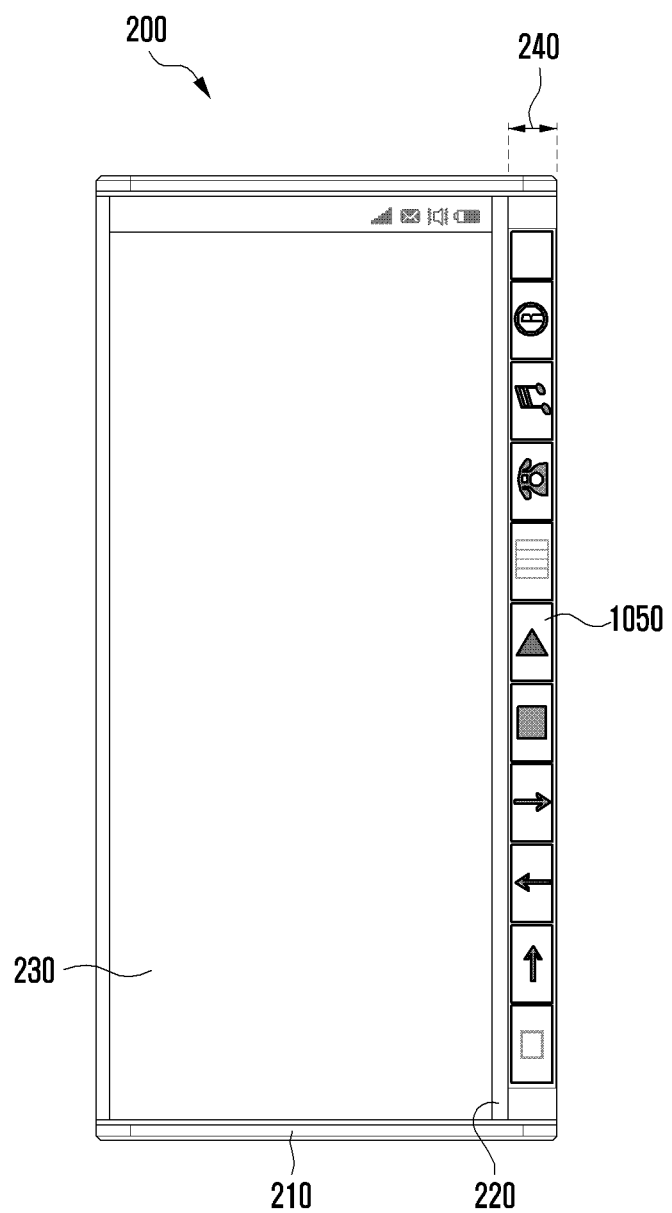

In an embodiment, the input/output device may be a button. The button may include a physical button or a virtual button. Referring to FIG. 10E, a button 1050 may be disposed in the hidden region 240. The processor 701 may perform various operations mapped to the button 1050 according to an input received through the button 1050 disposed in the hidden region 240.

Figure 10F:
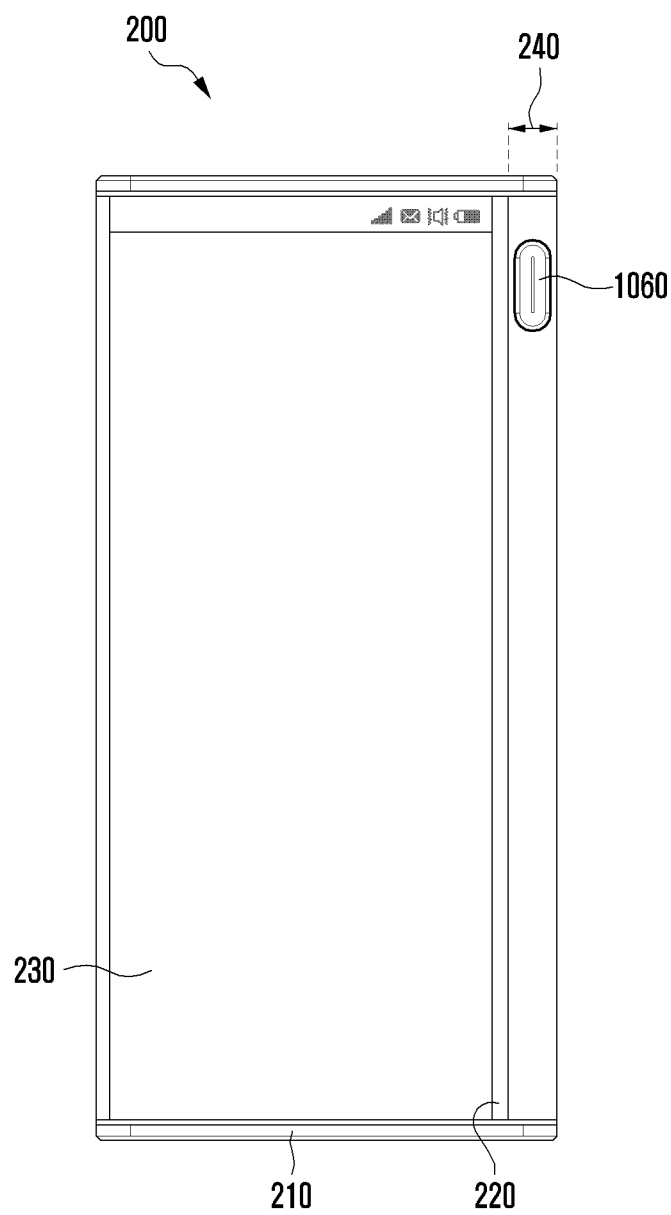

In one embodiment, the input/output device may be a connector. Referring to FIG. 10F, a connector 1060 may be disposed in the hidden region 240. The electronic device may be connected to an external electronic device by wire through the connector 1060. The connector 1060 may be, for example, a USB-C type connector 1060 as shown in FIG. 10F. The shape of the connector 1060 may be changed into various shapes according to standard technology in the connector field.

An electronic device (e.g., the electronic device 101 of FIG. 1, the electronic device 200 of FIGS. 2A to 2C) according to various embodiments disclosed herein may include a first housing (e.g., the first housing 210 of FIG. 2A), a second housing (e.g., the second housing 220 of FIG. 2A) slidably coupled with respect to the first housing, a display (e.g., the display 230 of FIG. 2A) at least partially fixed to the second housing and including an information display region (e.g., the information display region 201 of FIG. 2A) increasing or decreasing according to the sliding of the second housing, the information display region being a part of the electronic device visible to the outside, and a support member (e.g., the support member 310 of FIG. 3B) including a bendable structure and configured to support at least a part of the display and move according to the sliding of the second housing, wherein the display is configured such that the information display region increases in case that the second housing slides in a first direction at a reference position at which the end of the second housing and the end of the first housing are substantially aligned with each other, and the information display region decreases in case that the second housing slides in a second direction opposite to the first direction at the reference position.

The display may include a first region (e.g., the first region 230A of FIG. 4A), a second region connected to the first region (e.g., the second region 230B of FIG. 4A), and a third region (e.g., the third region 230C of FIG. 4A) connected to the second region wherein, in case that the second housing is at the reference position, the first region and the second region form the information display region, and the third region is received in a receiving space (e.g., the receiving space 430 of FIG. 4A) included in the first housing.

In the display, in case that the second housing slides in the first direction at the reference position, at least a part of the first region, the second region, and the third region may form the information display region.

In the display, in case that the second housing slides in the second direction at the reference position, at least a part of the second region may be received in the receiving space of the first housing.

The first housing may include a guide housing (e.g., the guide housing 214 of FIG. 5B) including a guide rail (e.g., the guide rail 214-1 of FIG. 5B) configured to guide the movement of the support member and the second housing.

The support member may include a first support part (e.g., the first support part 310A of FIG. 4A) configured to support the second region of the display, and a second support part (e.g., the second support part 310B of FIG. 4A) configured to support the third region, and the second housing may support the first region of the display.

The first support part of the support member may be positioned on a first surface of the first housing facing the second housing in case that the second housing is at the reference position.

The electronic device may further include a first protrusion (e.g., the first protrusion 610 of FIG. 6A) disposed on the first housing and a second protrusion (e.g., the second protrusion 620 of FIG. 6A) disposed on the second housing, wherein, in case that the second housing is at the reference position, the second protrusion may be caught by the first protrusion so that the second housing is stopped at the reference position.

The electronic device may further include an elastic member (e.g., the elastic member 630 of FIG. 6A) disposed between the first housing and the second housing, wherein, in case that the second housing slides in the second direction at the reference position, the elastic member is configured to provide an elastic force in a direction in which the second housing slides in the first direction.

The electronic device may further include a displacement sensor (e.g., the displacement sensor 720 of FIG. 7) configured to detect a sliding displacement of the second housing with respect to the first housing.

The electronic device may further include a hidden region (e.g., the hidden region 240 of FIG. 2C) positioned between the second housing and the first housing and exposed to the outside of the electronic device according to the sliding of the second housing in the second direction at the reference position.

The electronic device may further include a receiving space (e.g., the receiving space of FIG. 2C) disposed in the hidden region of the first housing.

The receiving space may be configured to receive an external electronic device, and may further include a receiving identification sensor (e.g., the receiving identification sensor 292 of FIG. 3D) configured to identify whether the external electronic device received in the receiving space is received.

The electronic device may further include an input/output device disposed in the hidden region.

The input/output device may be at least one of an auxiliary display, an audio device, a camera, a connector, a physical button, and a virtual button.

An electronic device (e.g., the electronic device 101 of FIG. 1, the electronic device 200 of FIGS. 2A to 2C) according to various embodiments disclosed herein may include a first housing (e.g., the first housing 210 of FIG. 2A), a second housing (e.g., the second housing 220 of FIG. 2A) slidably coupled with respect to the first housing, a display (e.g., the display 230 of FIG. 2A) at least partially fixed to the second housing and including an information display region (e.g., the information display region 201 of FIG. 2A) increasing or decreasing according to the sliding of the second housing, the information display region being a part of the electronic device visible to the outside, a support member (e.g., the support member 310 of FIG. 3B) including a bendable structure and configured to support at least a part of the display and move according to the sliding of the second housing, and a hidden region (e.g., the hidden region 240 of FIG. 2C) positioned between the second housing and the first housing and exposed to the outside of the electronic device by the sliding of the second housing with respect to the first housing.

The electronic device may further include a receiving space (e.g., the receiving space of FIG. 2C) disposed in the hidden region of the first housing.

The receiving space may be configured to receive an external device, and may further include a receiving identification sensor (e.g., the receiving identification sensor 292 of FIG. 3D) configured to identify whether the external device received in the receiving space is received.

The electronic device may further include an input/output device disposed in the hidden region.

The input/output device may be at least one of an auxiliary display, a speaker, a camera, a connector, a physical button, and a virtual button.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first housing;
   a second housing slidably coupled with respect to the first housing;
   a display at least partially fixed to the second housing and comprising an information display region increasing or decreasing according to the sliding of the second housing, the information display region being a part of the display visible from an outside of the electronic device; and
   a support member comprising a bendable structure and configured to support at least a part of the display and move according to the sliding of the second housing,
   wherein the first housing includes a hidden region exposed or concealed according to the sliding of the second housing,
   wherein, when the second housing is at a first position, a size of the information display region is a first size, and the hidden region is covered by the second housing,
   wherein, when the second housing slides in a first direction from the first position to a second position, the size of the information display region increases to be greater than the first size, and the hidden region is covered by the second housing, and wherein, when the second housing slides in a second direction, opposite to the first direction, from the first position to a third position, the size of the information display region decreases to be smaller than the first size, and the hidden region is exposed to the outside of the electronic device.

2. The electronic device of claim 1,
wherein the display comprises a first region, a second region connected to the first region, and a third region connected to the second region, and
wherein, when the second housing is at the first position, the first region and the second region form the information display region, and the third region is received in a receiving space included in the first housing.

3. The electronic device of claim 2, wherein, when the second housing slides in the first direction from the first position to the second position, at least a part of the first region, the second region, and the third region form the information display region.

4. The electronic device of claim 2, wherein, when the second housing slides in the second direction from the first position to the third position, at least a part of the second region moves in the receiving space of the first housing.

5. The electronic device of claim 2, wherein the first housing comprises a guide housing comprising a guide rail configured to guide the movement of the support member and the second housing.

6. The electronic device of claim 5,
wherein the support member comprises a first support part configured to support the second region of the display, and a second support part configured to support the third region, and
wherein the second housing is configured to support the first region of the display.

7. The electronic device of claim 6, wherein, when the second housing is at the first position, the first support part of the support member is positioned on a first surface of the first housing facing the second housing.

8. The electronic device of claim 1, further comprising:
a first protrusion disposed on the first housing; and
a second protrusion disposed on the second housing,
wherein, when the second housing is at the first position, the second protrusion is caught by the first protrusion so that the second housing is stopped at the first position.

9. The electronic device of claim 1, further comprising:
an elastic member disposed between the first housing and the second housing,
wherein when the second housing slides in the second direction from the first position to the third position, the elastic member is configured to provide an elastic force in a direction in which the second housing slides in the first direction.

10. The electronic device of claim 1, further comprising:
a displacement sensor configured to detect a sliding displacement of the second housing with respect to the first housing.

11. The electronic device of claim 1, further comprising:
a receiving space disposed in the hidden region of the first housing.

12. The electronic device of claim 11, wherein the receiving space is configured to receive an external electronic device, and the electronic device further comprises a receiving identification sensor configured to identify whether the external electronic device is received in the receiving space.

13. The electronic device of claim 1, further comprising:
an input/output device disposed in the hidden region.

14. The electronic device of claim 13, wherein the input/output device is at least one of an auxiliary display, an audio device, a camera, a connector, a physical button, and a virtual button.

* * * * *